US011005892B2

(12) United States Patent
Manor et al.

(10) Patent No.: US 11,005,892 B2
(45) Date of Patent: May 11, 2021

(54) SYSTEM, METHOD, AND APPARATUS OF SECURING AND MANAGING INTERNET-CONNECTED DEVICES AND NETWORKS

(71) Applicant: Allot Communications Ltd., Hod HaSharon (IL)

(72) Inventors: Yair Manor, Netanya (IL); Yaron Muzikant, Petach Tikva (IL)

(73) Assignee: ALLOT LTD., Hod Hasharon (IL)

( * ) Notice: Subject to any disclaimer, the term of this patent is extended or adjusted under 35 U.S.C. 154(b) by 269 days.

(21) Appl. No.: 16/132,422

(22) Filed: Sep. 16, 2018

(65) Prior Publication Data

US 2019/0089748 A1 Mar. 21, 2019

Related U.S. Application Data

(60) Provisional application No. 62/559,579, filed on Sep. 17, 2017, provisional application No. 62/559,581, (Continued)

(51) Int. Cl.
*H04L 29/06* (2006.01)
*H04W 28/18* (2009.01)
(Continued)

(52) U.S. Cl.
CPC ........ *H04L 63/205* (2013.01); *H04L 41/0893* (2013.01); *H04L 43/028* (2013.01); *H04L 63/1425* (2013.01); *H04L 63/1441* (2013.01); *H04W 8/005* (2013.01); *H04W 12/08* (2013.01); *H04W 12/0808* (2019.01);
(Continued)

(58) Field of Classification Search
CPC .............. H04L 63/205; H04L 63/1425; H04L 63/1441; H04L 41/0893; H04L 41/5096; H04L 43/028; H04W 12/0808; H04W 12/08; H04W 24/08; H04W 28/0231; H04W 28/18; H04W 84/12
See application file for complete search history.

(56) References Cited

U.S. PATENT DOCUMENTS 5,623,601 A * 4/1997 Vu ........................ H04L 29/06
726/12
6,611,863 B1 * 8/2003 Banginwar ............. H04L 41/12
709/203
(Continued)

*Primary Examiner* — Sarah Su
(74) *Attorney, Agent, or Firm* — Eitan Mehulal Sadot

(57) ABSTRACT

System, method, and apparatus of securing and managing Internet-connected devices and networks. A wireless communication router is installed at a customer venue, and provides Internet access to multiple Internet-connected devices via a wireless communication network that is served by the router. A monitoring and effecting unit of the router performs analysis of traffic that passes through the router; identifies which Internet-connected devices send or receive data; and selectively enforces traffic-related rules based on policies stored in the router. Optionally, the monitoring and effecting unit is pre-installed in the router in a disabled mode; and is later activated after the router was deployed at a customer venue. Optionally, the router notifies the Internet Service Provider the number and type of Internet-connected devices that are served by the router.

29 Claims, 10 Drawing Sheets

Related U.S. Application Data filed on Sep. 17, 2017, provisional application No. 62/559,582, filed on Sep. 17, 2017.

(51) Int. Cl.
  *H04W 28/02* (2009.01)
  *H04W 24/08* (2009.01)
  *H04W 8/00* (2009.01)
  *H04L 12/26* (2006.01)
  *H04W 12/08* (2021.01)
  *H04L 12/24* (2006.01)
  *H04W 84/12* (2009.01)

(52) U.S. Cl.
  CPC ....... *H04W 24/08* (2013.01); *H04W 28/0231* (2013.01); *H04W 28/18* (2013.01); *H04L 41/5096* (2013.01); *H04W 84/12* (2013.01)

(56) References Cited

U.S. PATENT DOCUMENTS

| | | | |
|---|---|---|---|
| 7,047,561 B1* | 5/2006 | Lee | H04L 29/12009 726/12 |
| 7,990,935 B2* | 8/2011 | Oyama | H04W 28/06 370/338 |
| 10,154,007 B1* | 12/2018 | Viswanathan | H04L 63/20 |
| 2010/0188975 A1* | 7/2010 | Raleigh | H04M 15/61 370/230.1 |
| 2014/0068030 A1* | 3/2014 | Chambers | H04L 41/0809 709/220 |
| 2015/0019700 A1* | 1/2015 | Masterson | G06F 9/5072 709/223 |
| 2015/0189044 A1* | 7/2015 | Pastor Perales | H04L 67/24 709/217 |
| 2016/0117495 A1* | 4/2016 | Li | G06F 21/6209 726/1 |
| 2016/0275303 A1* | 9/2016 | Narayanaswamy | H04L 9/0861 |
| 2017/0171231 A1* | 6/2017 | Reybok, Jr. | G06F 16/23 |
| 2018/0020002 A1* | 1/2018 | Duca | G06F 21/572 |
| 2018/0048514 A1* | 2/2018 | Arunachalam | H04L 63/20 |
| 2018/0063857 A1* | 3/2018 | Caplan | H04N 21/4784 |
| 2018/0102901 A1* | 4/2018 | Linton | H04L 9/3236 |
| 2018/0247188 A1* | 8/2018 | Wong | G06F 40/30 |
| 2019/0124541 A1* | 4/2019 | Henry | H04L 12/66 |
| 2019/0364047 A1* | 11/2019 | Awate | G06F 9/452 |
| 2020/0169890 A1* | 5/2020 | Kaushik | H04W 12/12 |

* cited by examiner

SYSTEM, METHOD, AND APPARATUS OF SECURING AND MANAGING INTERNET-CONNECTED DEVICES AND NETWORKS

CROSS-REFERENCE TO RELATED APPLICATIONS

This application claims benefit and priority (i) from U.S. provisional patent application No. U.S. 62/559,579, filed on Sep. 17, 2017; and (ii) from U.S. provisional patent application No. U.S. 62/559,581, filed on Sep. 17, 2017; and (iii) from U.S. provisional patent application No. U.S. 62/559,582, filed on Sep. 17, 2017; all of which are hereby incorporated by reference in their entirety.

FIELD

The present invention relates to the field of network security.

BACKGROUND

Millions of people all over the world utilize electronic devices on a daily basis. For example, people utilize laptop computers, desktop computers, smartphones, tablets, and other electronic devices, which may be able to connect to the Internet.

Such electronic devices are utilized for various purposes; for example, to send and receive electronic mail (Email), to engage in Instant Messaging (IM) or video conferences, to consume digital content or audio/video, to capture images and videos, to browse Internet websites, to perform online purchases, to play games, or the like.

SUMMARY

Embodiments of the present invention comprise a system, a method, and an apparatus for securing and managing Internet-connected devices and networks. For example, a wireless communication router is installed at a customer venue, and provides Internet access to multiple Internet-connected devices via a wireless communication network that is served by the router. A monitoring and effecting unit of the router performs analysis of traffic that passes through the router; identifies which Internet-connected devices send or receive data; and selectively enforces traffic-related rules based on policies stored in the router. Optionally, the monitoring and effecting unit is pre-installed in the router in a disabled mode; and is later activated after the router was deployed at a customer venue. Optionally, the router notifies the Internet Service Provider the number and type of Internet-connected devices that are served by the router.

Embodiments of the present invention may provide other and/or additional benefits and/or advantages.

DETAILED DESCRIPTION OF SOME DEMONSTRATIVE EMBODIMENTS

Figure 1:
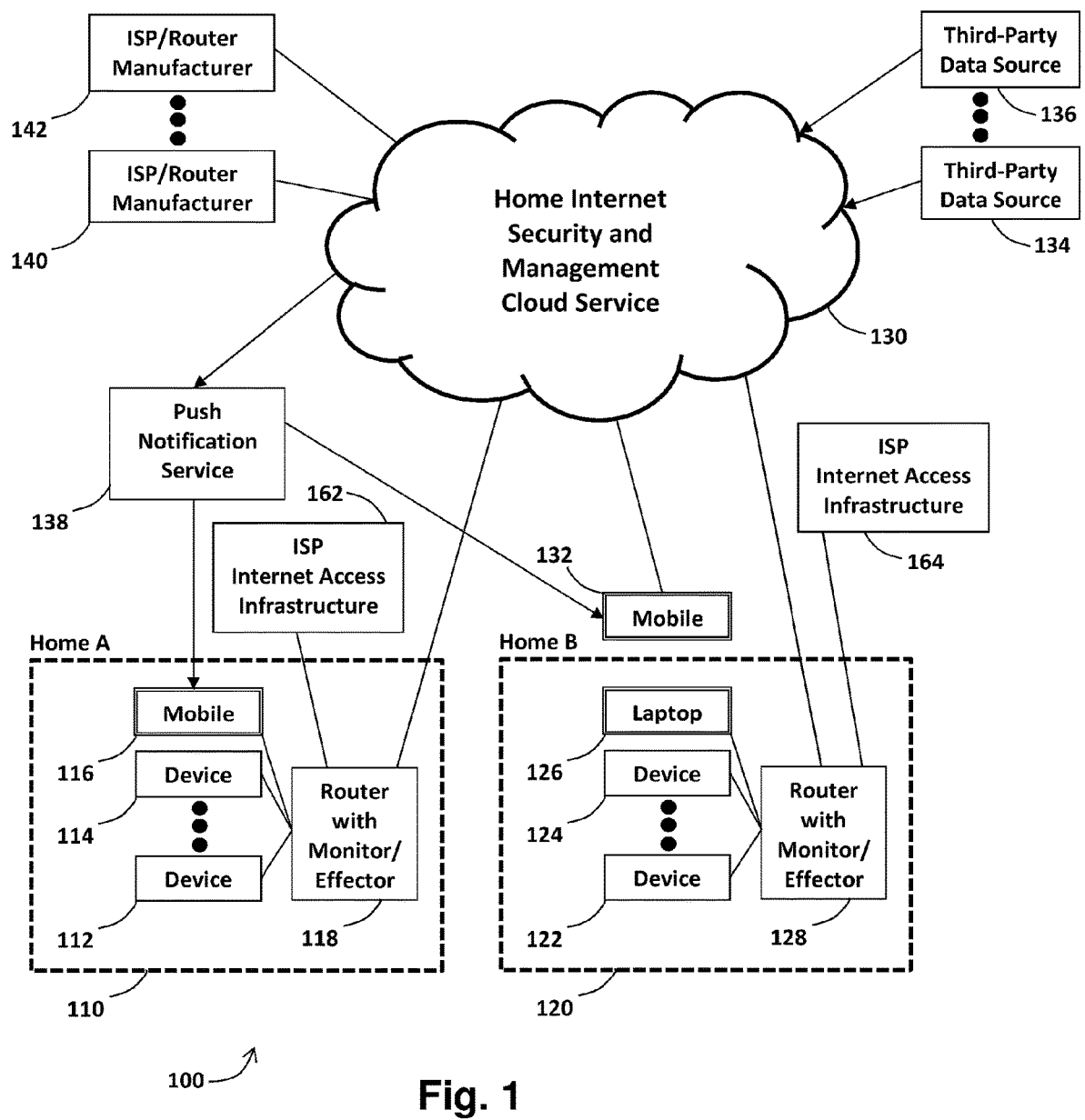
FIG. 1 is a schematic block-diagram illustration of a system demonstrating management and deployment of Internet security in a home-based network or an organizational network, in accordance with some demonstrative embodiments of the present invention.

Some embodiments may provide a home Internet security and management system which may track and monitor the internal home network (or networks) and its connection to the Internet, for traffic patterns that indicate malicious or unwanted or abnormal or irregular behavior, or for the purpose of detecting Internet-usage issues or problems or abnormalities.

The system may modify or handle or manipulate the traffic in real-time or in near-real-time or in a delayed fashion, according to preset or configurable logic or based on a set of pre-defined rules or criteria; for purposes that may include, for example, security protection, cyber security, fraud prevention, hacking prevention, preventing or reducing security breaches, enforcing parental control, enforcing or ensuring quality of service (QoS) rules, performing device management or device configuration, network troubleshooting, and other Internet-connection management operations.

The modifications or handling or manipulation operations may include, for example, connection blocking, content filtering, content insertion, content modification, content replacement, content augmentation, content deletion, traffic redirection, bandwidth manipulation, traffic shaping, diversion or redirection or packets or traffic or files, modification of packets or files or traffic, or the like.

The system may reside on a home router or gateway, or on an organizational router or gateway; which may be physical, or virtual, or in a cloud computing structure; and may comprise hardware components and/or software components. Some components or modules may be pre-installed (e.g., on the router or gateway), or may be installed on-demand by the user or by a third party (e.g., an Internet service provider (ISP); a network administrator). Optionally, at least part of the system may be implemented as a cloud-computing service, that receives statistical data and queries from the system's router component, and responds by sending to such router one or more updates, upgrades, downgrades, policies or rules to be enforced, commands or operations to be performed, or other insights.

The system may be managed through the home router itself, and/or through a cloud based platform, and/or via another device (e.g., a web-browser on a laptop computer). Viewing or management access may be provided to the user and/or to third parties (e.g., the ISP, or a network administrator). Upon detection of certain pre-defined events or types of events, the system may alert the user, may log the event, may send a report or a notification to an external entity or a remote entity, and/or may perform traffic manipulations or other traffic-related operations based on one or more rules. The system may also (e.g., periodically or continuously) collect and maintain usage statistics and patterns, and may optionally transmit them to a network administrator, an ISP, a router provider, a gateway provider, the user, or other entities.

Some embodiments may provide solutions in the field of Internet security, network security, network management and monitoring, remote configuration or modifications of a communications network, and other related solutions.

The Applicants have realized that in the era of Internet of Things (IoT), there are numerous types of devices that have their own Internet Protocol (IP) address, and that communicate with the public Internet, such as via a home router or access point, an organizational router or access point, wired or wireless communication links, or the like. Such devices may include, for example, laptop computers, desktop computers, smart televisions, smartphones, tablets, smart-watches, gaming consoles, as well as various types of Internet-connected sensors and appliances (e.g., thermostat, smoke detector, security camera, entertainment devices, or the like).

The Applicants have also realized that even cellular-connected devices, such as smartphones and some tablets, increasingly utilize home-based or organizational Wi-Fi networks when the device is located in a home or at a business establishment, and they access the Internet via the home wireless network or the organizational wireless network rather than by using their built-in cellular transceiver.

The Applicants have realized that as more and more devices are connected to the home (or organizational) network, new security challenges are introduced, and it becomes harder to control and manage such devices. The Applicants have realized that there is a need for a comprehensive solution that provides security, visibility, control, and management to the electronic devices that are connected to the home network or to a similar organizational network.

The present invention comprises a system, a method, and architecture for home Internet security and network security, as well as network management and device management; which may provide security, visibility, control, and management to the devices connected to the home network or the organizational network. The system may comprise, for example, an on-router home-network monitor/effector unit; a cloud-based server that provides a cloud-based service; and a management/reporting console. For demonstrative purposes, portions of the discussion herein may relate to a "home router" or "home network" or "home gateway"; however, these terms and similar terms may also comprise an "organizational" or "enterprise" router, gateway, network, or the like.

The on-router home-network monitor/effector unit may be a lightweight and efficient component or module that is installed in the home router or gateway or access point or set-top box. The monitor/effector unit may be implemented using hardware components and/or software components. The software components may be pre-installed, or may be installed on-demand on an existing router or gateway by the user or by a third party (e.g., an Internet Service Provider (ISP); a cable television company; or the like). Optionally, the router itself may be a virtual appliance, or may reside in the cloud, or may be implemented as a "soft" unit within a local set-top box or computer or laptop or other device. The monitor/effector unit may protect the connected devices from internal and external threats that use the network, may allow device management and QoS modifications for chosen devices, may provide visibility into the network coupled with network troubleshooting assistance, may provide parental controls or may enforce pre-defined parental control rules (e.g., a rule or a set of rules, that are set or defined or selected by a parent or caregiver or head-of-family or account owner, which define which content may be consumed or served towards one or more particular devices in the home network; for example, parental control rules that block serving of a movie or a television show or a game or an application that has a first rating score, and that allow serving of such item if it has a second, different, rating score), and/or may provide other types of value-added services.

The monitor/effector unit monitors and analyzes the traffic among the connected home devices (e.g., among themselves), and/or the traffic between the connected home devices and the Internet. Based on static and dynamic policies, pre-defined policies and/or dynamically-modified policies, and optionally also based on the analysis of traffic, the monitor/effector unit may perform an action concerning the traffic. The analysis may be performed locally within the router, and/or remotely in a cloud-based server or service. One category of actions comprises traffic manipulation, for example, connection blocking, content filtering, content insertion, content modification, content replacement, content augmentation, content censorship, content redaction or reduction, traffic redirection, bandwidth manipulation, bandwidth limiting, or the like. Other actions may include logging, reporting, generating and sending notifications, and alerting. Additionally, periodically or on-demand, the monitor/effector unit receives updates and updated policies or updated rules from the cloud-based server, and enforces such updated policies locally within the home-network that locally serves the various Internet-connected devices.

In some embodiments, the monitoring and effecting unit is to enforce a user-defined rule that selectively blocks intra-network communication between (i) a first particular Internet-connected device, and (ii) a second particular Internet-connected device; for example, enforcing a user-defined rule that defines that a particular Tablet (e.g., which is generally utilized by a child to play games) is not allowed to communicate with a particular Laptop computer (e.g., which is generally utilized by a parent for work purposes). In some embodiments, the monitoring and effecting unit is to enforce a pre-defined rule that selectively blocks intra-network communication between (i) a first particular type of Internet-connected devices, and (ii) a second particular type of Internet-connected devices; for example, a pre-defined rules that defines that a "smart lightbulb" is not authorized to communicate with a "smart fridge" or with a "smart television" or with a laptop computer, or that defines other pairs or groups of devices (e.g., based on type; based on maker and/or model; based on device characteristics; or the like) that are not allowed to communicate with each other (uni-directionally or bi-directionally), or that are positively allowed to communicate with each other (uni-directionally or bi-directionally). In some embodiments, the monitoring and effecting unit is to selectively block intra-network communication between (i) a first particular type of Internet-connected devices, and (ii) a second particular type of Internet-connected devices, based on Deep Packet Inspection (DPI) analysis of traffic within said network; for example, such that the DPI analysis leads to a determination that a smart television is attempting to communicate with a smart fridge, and therefore, based on a user-defined rule or based on the traffic-related policy within the router, to block (or conversely, to allow) such traffic. In some embodiments, the monitoring and effecting unit is to selectively block communication from or to said wireless communication router, based on said traffic-related policy, thereby protecting the router itself in a manner similar to protecting other end-user devices or Internet-connected devices on the network. In some embodiments, the monitoring and effecting unit is to selectively block Internet traffic based on a geographic location in which said apparatus is located. In some embodiments, the monitoring and effecting unit is to selectively block Internet traffic based on a particular type of Internet-connected device that is connected within said network. In some embodiments, the monitoring and effecting unit is to selectively block only a particular type of Internet traffic based on said traffic-related policy. Other suitable rules or policies may be defined, modified, and/or enforced by the router; and the enforced rules or policies, as well as the in-router database of rules and/or policies, may be updated or modified based on the particular characteristics of the router, based on the particular characteristics of the Internet-connected devices that are connected in this specific network and/or that are served by that router, based on the geographic location or region in which the router is located, or the like.

The cloud-based service or server receives usage and traffic statistics and metadata from the on-router monitor/effector unit, as well as queries and notifications on particular or pre-defined events (e.g., an event of blocking a malicious action). The cloud-based service or server also receives data from third-party data sources, such as, threat-intelligence providers, databases or updates about new or current threats or attack vectors, or the like. The cloud-based service or server may also receive policy-change requests from the user, and/or from the ISP or cable company or other communications service provider. An analysis engine (e.g., cloud-based) analyzes the data from the connected router, from other connected routers (e.g., in other homes and organizations), from the third-party data sources, and from the user and the ISP (or service provider); and generates a lean representation of a policy and threat database (DB) combination, tailored specifically for that particular home network and for that particular home router. The representation of the particular policy and DB are sent (e.g., wirelessly, or via a wired connection) to the corresponding monitor/effector unit of the home router, which enforces the newly-updated policy. Additionally, the cloud-based service saves the statistics and metadata and event information received from the home routers, and responds to queries with suitable answers.

The management/reporting console allows the user to connect his or her mobile device or laptop or desktop computer to the cloud-based service, in order to gain visibility into the network, to change policies, and to receive real-time notifications about important events. The console provides role-based access control (RBAC), which allows other users to gain access to the same console, optionally with restricted access or actions or with reduced privileges (e.g., read-only privilege to a secondary user). The console may also be accessed locally, via a direct connection (wired or wireless) to the monitor/effector unit, either with full functionality or with reduced functionality. Third-parties, such as the user's ISP or service provider, may also be allowed to connect to a special console that may present some or all of the relevant information for that home network or home router, and may allow it to command or to request or to propose one or more actions pertaining to a particular connected router or to multiple connected routers.

Reference is made to FIG. 1, which is a schematic block-diagram illustration of a system 100 demonstrating management and deployment of Internet security in a home-based network or an organizational network, in accordance with some demonstrative embodiments of the present invention.

For example, Home A of user Adam may comprise a wireless home network 110; and a neighboring Home B of user Bob may comprise another wireless home network 120. Each wireless home network (110, 120) includes a router having a Monitor/Effector unit (118, 128); as well as various devices that are connected to the home network (devices 112, 114, 116; devices 122, 124, 126), such as mobile devices (smartphones, tablets, smart-watches), laptop computers, desktop computers, smart television(s), IoT devices (lamps, home appliances, alarm systems, sensors, smoke detectors, security camera, or the like), and/or other network devices or Internet-connected devices.

Wireless communication router 118 is connected to an Internet Service Provider (ISP) Internet access infrastructure 162; for example, via a wired link, a cable, a "last mile" wired connection, a fiber-optics link, or the like. Similarly, wireless communication router 128 is connected to an Internet Service Provider (ISP) Internet access infrastructure 164, which may be the same ISP or a different ISP; for example, via a wired link, a cable, a "last mile" wired connection, a fiber-optics link, or the like. In some embodiments, optionally, router 118 may be connected to Internet infrastructure via other suitable means; for example, using a cellular 3G or 4G or 4G-LTE or 5G transceiver or communication link, or using a satellite-based Internet connection, or the like.

Each wireless communication router (118, 128) may comprise a wired transceiver which receives downstream or incoming Internet traffic such as TCP/IP packets from the ISP Internet access infrastructure (162, 164) over a wired link (or, in some embodiments, over a wireless communication link, a cellular communication link, or the like). Each wireless communication router (118, 128) may comprise a wireless communication transceiver (e.g., a Wi-Fi transceiver, an IEEE 802.11 transceiver) that wirelessly transmits (or, in some embodiments, that transports over wired links) the incoming or the downstream TCP/IP packets to their suitable destination within the wireless home network (110, 120), namely, to the particular Internet-connected device that the downstream or incoming TCP/IP packets are destined to. It is noted that references herein to a "wired" link may also include a "wireless link"; and, references herein to a "wireless" link may also include a "wired" link.

Similarly, each wireless communication router (118, 128) utilizes its wireless communication transceiver (e.g., a Wi-Fi transceiver, an IEEE 802.11 transceiver) to wirelessly receive outgoing or upstream TCP/IP packets that are transmitted wirelessly to the wireless communication router (118, 128) by one or more of the Internet-connected devices. Then, each wireless communication router (118, 128) utilizes its wired transceiver to transmit over its wired link the upstream or outgoing Internet traffic such as TCP/IP packets, towards the ISP Internet access infrastructure (162, 164), thereby delivering to the public Internet the TCP/IP packets that originated from the various Internet-connected devices within the wireless home network (110, 120).

Each wireless communication router (118, 128) operates to establish or create or generate a Wireless Local Access Network (W-LAN) in the relevant home, thereby creating or establishing the relevant home networks (110, 120) having their unique wireless network identifier or wireless network name or Service Set Identifier (SSID) or other unique identifier. Optionally, each such W-LAN generated and managed by the router (118, 128) may utilize cryptography, encryption and/or decryption standards or protocols (e.g., WAP, WAP2, WEP, or the like) to operate as a secured W-LAN in which a password or passphrase or other credentials are required prior to authorizing a device to connect to the W-LAN. Optionally, each router (118, 128) may comprise or may utilize a W-LAN generator/manager module or unit, which may control and manage the operations of creating a W-LAN, managing it, authorizing or un-authorizing the joining of a new device to the W-LAN, or the like.

Each home network (110, 120) has at least one designated device (e.g., device 116, device 126, device 132) that the relevant user (user Adam for Home A; user Bob for Home B) may use to manage and/or receive notifications from the home Internet security and management system. In the network 120 of Home B, that has more than one such device (126, 132), each one of those devices (126, 132) may have different viewing/management capabilities or privileged (e.g., read and write; read-only; view all available data; view only a subset of the data)), based on the user's role (e.g., primary user; secondary user). The management device may be a mobile device (e.g., 116, 132) or a computer (e.g., 126), may be portable or non-portable; and may connect to the home router via a wireless link or via a wired link (e.g., cable or wire).

The management device (116, 126) may optionally be part of the home network (110, 120); but need not necessarily be part of the home network (e.g., device 132) and may connect to the Cloud Service 130 independently (e.g., with credentials for authentication). In some embodiments, the home user (Adam, Bob) may not have any management/notification capabilities at all; and all the management or notifications functionalities are handled by the ISP or the router manufacturer or provider (140, 142). Regardless of whether or not the home user (Adam or Bob) has management/notification capabilities, the ISP/router manufacturer (140, 142) may be granted management/viewing access to some or all of the devices that it supplied to its direct (or indirect) customers.

The devices connected to the home network (e.g., devices 112, 114, 116; devices 122, 124, 126) are connected, directly or indirectly, to the home router containing the Monitor/Effector (118, 128). Each such router (118, 128) may see and may also control the traffic flowing inside the home network, e.g., the traffic among the devices (112, 114, 116, 122, 124, 126) themselves, and/or the traffic flowing between the home network and the Internet.

The monitoring module of each router (118, 128) monitors and analyzes the traffic flows; and based on that analysis, the Effector module of each router (118, 128) may selectively act, for purposes such as cyber security, protection, parental control, quality of service (QoS), Quality of Experience (QoE), device management, network troubleshooting and Internet-connection management.

One demonstrative category of actions that the Effector module of the router (118, 128) may perform is traffic manipulation, which may include connection blocking, content filtering, content insertion, content modification, traffic redirection, and/or bandwidth manipulation. Other actions may include logging, reporting, generating and sending notifications, and alerting. The Monitor/Effector pair of each router (118, 128) is connected via wireless or wired link to the Cloud Service 130, and sends to it statistics and queries, as well as notification messages (e.g., about locally identified events, and/or locally performed actions). The Cloud Service 130 sends back replies, policy changes or updates, updated rules to be enforced by the monitor/effector of the home router (118, 128), and software and DB updates. The interactions between the router (118, 128) and the Cloud Service 130 may be periodic, or at particular time intervals (e.g., every hour, every day), or on demand, or when a pre-defined condition holds true (e.g., an event that requires reporting has occurred; an urgent update is required due to a new threat).

The home Internet security and management Cloud Service 130 receives data, constantly, periodically or on-demand, from third-party data sources (134, 136). The data may include, for example, threat-intelligence, Uniform Resource Locator (URL) categorization, URL or URI that are in a white-list of approved destinations, URL or URI that are in a black-list of disapproved or malicious or suspicious destinations, data about new threats and attack vectors, data about particular possible malfunctions or vulnerabilities, or the like.

In addition, the Cloud Service 130 receives notifications and statistics from the home routers (118, 128); as well as policy-change requests from the users (e.g., from user Adam via device 116; from user Bob via devices 126, 132), and/or from ISPs/router manufacturers (140, 142).

The Cloud Service 130 analyzes the data received from all sources, and uses it to answer requests made by the routers (118, 128), and to provide the routers (118, 128) with up-to-date policies for enforcement as well as DBs, specifically tailored for each router (118, 128) and for their home network (110, 120). For example, a first particular updated policy and DB is sent to router 118 for deployment and enforcement in home network 110 of user Adam; whereas, a second particular updated policy and DB is sent to router 128 for deployment and enforcement in home network 120 of user Bob; the differences are based, for example, since router 110 serves an Internet-connected smoke detector in Home A whereas router 120 does not; or since router 120 serves an Internet-connected security camera in Home B whereas router 110 does not; or since the number, or type, or functionality, of the devices in Home A is different from those in Home B; or since a particular threat or vulnerability was announced with regard to a type or a model of a device that exists in Home A but not in Home B; or since Home A is located in a first country (or a first geographical region), whereas Home B is located in a second country (or a second geographical reason), and the Cloud Service administrator has one or more indicators that the first geographical region (and not the second geographical region) is currently undergoing a particular cyber attack or is estimated to be exposed to a particular vulnerability; or the like.

The Cloud Service 130 may provide the user (Adam, Bob) with the ability to view and manage the characteristics of his home network (110, 120) through his management devices (116, 126, 132). The Cloud Service may optionally utilize a push notification service 138, such as Apple Push Notification Service (APNS) or Google/Firebase Cloud Messaging (GCM/FCM) or other suitable Push-based notification, or other communication channel (e.g., SMS message, Instant Messaging platform, Email) in order to provide notifications and/or alerts to the user's devices or particularly to a mobile management device (116, 132). The Cloud Service 130 may also provide to the user's management devices (116, 126, 132) one or more alerts or notifications via email, Short Message Service (SMS), social media messages, Instant Messaging applications, or other means. In some embodiments, all such communications, or some of them, from the Cloud Service 130 or to it, may be encrypted, such as using TLS/HTTPS or other suitable cryptographic methods that provide data encryption, data decryption, message validation or authentication (e.g., digital signatures), or the like.

Figure 2A:
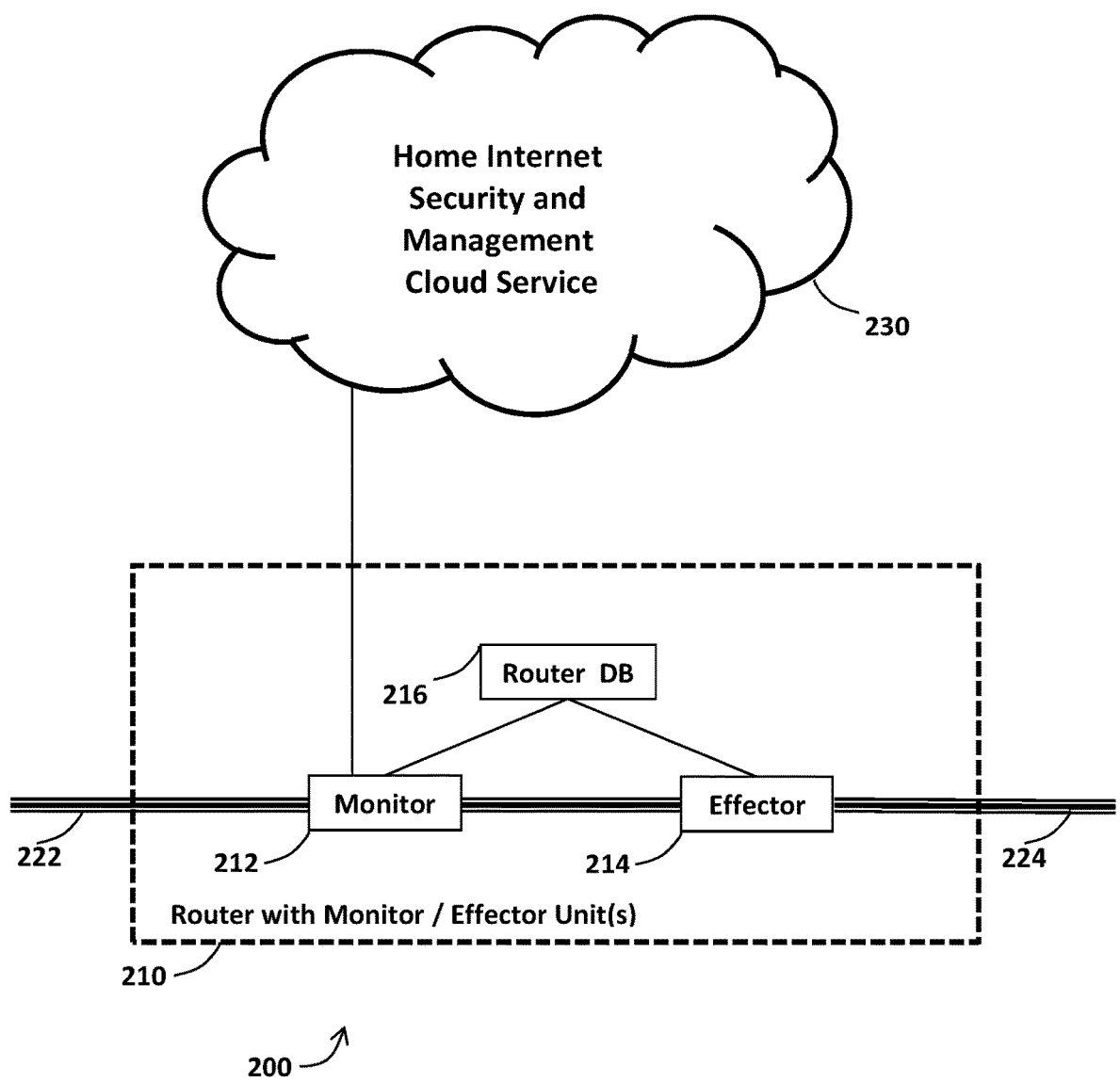
FIG. 2A is a schematic block-diagram illustration of a system demonstrating the home Internet security and management on-router components, in accordance with some demonstrative embodiments of the present invention.

Reference is made to FIG. 2A, which is a schematic block-diagram illustration of a system 200 demonstrating the home Internet security and management on-router components, in accordance with some demonstrative embodiments of the present invention. For example, a router 210 comprises a Monitor Unit 212, an Effector Unit 214, and a Router DB 216; all of which (210, 212, 214, 216) may be implemented using hardware components and/or software components. The location of the components (210, 212, 214, 216) may be at the user's home and/or at the ISP's cloud, or as part of the Customer Premises Equipment (CPE), at a virtual CPE (vCPE), or implemented using Network Functions Virtualization (NFV) and/or Software Defined Networking (SDN). Optionally, the components (212, 214, 216) may be installed on or added to or plugged into a pre-existing router 210 that the user already uses, as an addition or extension or accessory and/or as a replacement to the current router's units and/or software. The components may be pre-installed on the router 210, or may be later installed on-demand by the user or by the relevant ISP/router manufacturer or service provider.

In some embodiments, any traffic entering the router (traffic 222) in any direction (in-in, in-out, out-in) passes through the Monitor Unit 212. The Monitor Unit 212 may selectively analyze the traffic 222 based on a static or dynamic policy, that may have been previously received from the Cloud Service 230 and that is locally stored in the Router DB 216.

The results of the traffic analysis, as well as statistics regarding the traffic, may be saved to the Router DB 216 and/or may be communicated or transmitted to the Cloud Service 230. The Monitor Unit 212 also receives software updates, DB updates and/or policy updates from the Cloud Service 230.

Traffic that already passed the Monitor Unit 212 reaches the Effector Unit 214. The Effector Unit 214 consults or checks the policy currently in effect, and the analysis results generated by the Monitor Unit 212; and may choose to perform an action or to enforce a rule. One category of actions the Effector Unit 214 may perform comprises traffic manipulation, which may include, for example, connection blocking/teardown, content filtering, content insertion, content modification, traffic redirection, traffic steering, traffic re-routing, and bandwidth manipulation; these operations, or a set of these operations, may be enforced or performed with regard to all traffic, or in a selective manner with regard to malicious traffic, or in a selective manner with regard to non-malicious traffic, or with regard to traffic that has specific characteristics (e.g., only HTTP traffic; or, only HTTPS traffic; or, only FTP traffic; or, only traffic directed to a particular device or a particular destination; or, only traffic originating from or incoming from a particular device or a particular origin; or other traffic selection rules which define which traffic to subject, and not to subject, to the enforcement operations). Other actions may include logging, reporting, generating and sending notifications, and alerting.

The resulting action, if selected and/or performed, is saved in the Router DB 216, and may be communicated by the Monitor Unit 212 to the Cloud Service 230. In some embodiments, unless the action results in blocking/tearing down the connection, the traffic (e.g., the possibly modified) continues as outgoing traffic 224 on its way to its destination (or, possibly modified destination). In some modes of operation, the Effector Unit 214 may delay its decision on which action to take out of two or more possible actions, or its decision whether or not to take a particular action, while letting the traffic continue uninterrupted or unmodified as outgoing traffic 224; or may take a series of actions on the same traffic flow, possibly with intentional delays or time-intervals between the actions (e.g., to allow a first action to be completed, and to take a second action regarding the modified traffic).

Figure 2B:
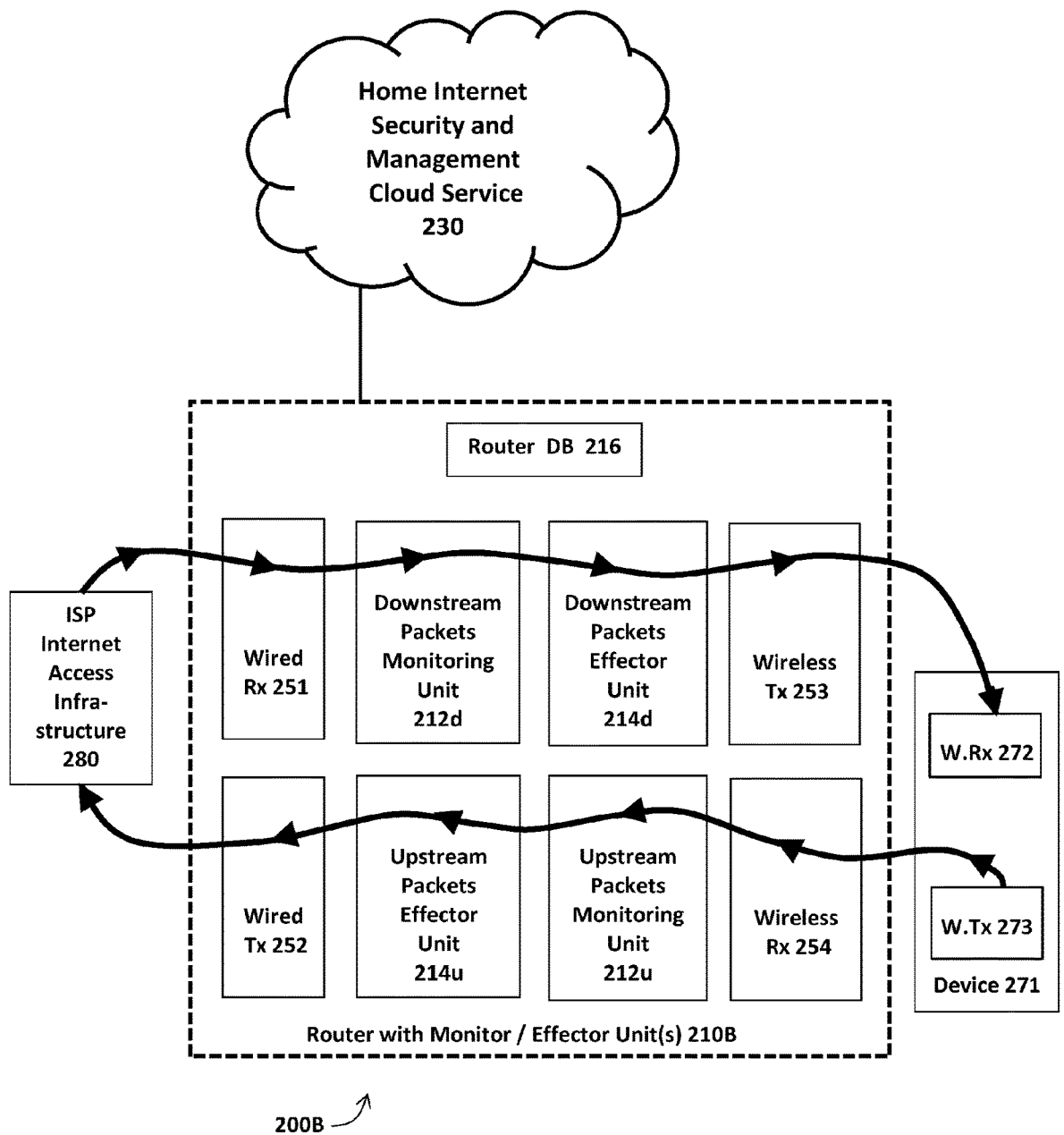
FIG. 2B is a schematic block-diagram illustration of another system demonstrating the home Internet security and management on-router components, in accordance with some demonstrative embodiments of the present invention.

Reference is made to FIG. 2B, which is a schematic block-diagram illustration of another system 200B demonstrating the home Internet security and management on-router components, in accordance with some demonstrative embodiments of the present invention. Some of the components of system 200B and their functionality, may be identical or generally similar to the components of system 200 and their functionality; however, in system 200, there are shown two distinct paths and two distinct sets of components for processing and handling downstream packets and upstream packets (even though, in some implementations, the two sets of components may be implemented as a unified set or as a bi-directional set of components).

It is noted that for demonstrative purposes, and as a non-limiting example only, FIG. 2B depicts a demonstrative embodiment in which the router is connected to Internet infrastructure via a wired connection; however, in other embodiments, the router may be connected to Internet infrastructure using wireless communication link(s), cellular communication link(s), satellite communication link(s), or the like. Similarly, for demonstrative purposes, and as a non-limiting example only, FIG. 2B depicts a demonstrative embodiment in which the router serves (or, is connected to) local Internet-connected devices via wireless links and/or via a wireless communication network (e.g., a Wi-Fi/802.11 wireless network); however, in other embodiments, the router may be connected to such devices using wired links, cables, wires, or other non-wireless connections.

Router with Monitor/Effector Unit(s) 210B is connected via a wired link to ISP Internet access infrastructure 280. In the downstream direction, for example, a wired receiver 251 of the router 210B receives downstream TCP/IP packets or incoming TCP/IP packets from the ISP Internet access infrastructure 280, which are destined to a device 271 equipped with a wireless receiver 272 and a wireless transmitter 273. However, instead of directly or immediately relaying or transmitting the downstream packets via the wireless transmitter 253 of the router 210B directly to the device 271, the downstream packets are monitored and/or modified and/or otherwise handled within the router 210B. For example, a downstream packets monitoring unit 212d monitors and analyzes the downstream packets, and generates insights that are stored in the router DB 216. Based on these insights, and/or based on pre-defined rules and/or dynamically-modified or dynamically-created rules or traffic-related policy stored in the router DB 216, a downstream packets effector unit 214d performs traffic modification operations on the downstream packets (e.g., packet filtering, packet blocking, packet discarding, packet adding, injection of other or new packets, packet replacement, packet modification); and only then, the modified or filtered or replaced or added downstream packets are transmitted wirelessly via the wireless transmitter 253 of the router 210B to their destination, namely, to the device 271.

In the upstream direction, the wireless transmitter 273 of the device 271, wirelessly transmit upstream or outgoing TCP/IP packets, which are received by a wireless receiver 254 of the router 210B. However, instead of immediately or directly delivering the upstream packets to the ISP Internet access infrastructure 280 via the wired transmitter 252 of the router 210B, the upstream packets are inspected, monitored, analyzed, and then handled or modified within the router 210B. For example, an upstream packets monitoring unit 212u monitors and analyzes the upstream packets, and generates insights that are stored in the router DB 216. Based on these insights, and/or based on pre-defined rules and/or dynamically-modified or dynamically-created rules or traffic-related policy stored in the router DB 216, an upstream packets effector unit 214u performs traffic modification operations on the upstream packets (e.g., packet filtering, packet blocking, packet discarding, packet adding, injection of other or new packets, packet replacement, packet modification); and only then, the modified or filtered or replaced or added upstream packets are transmitted via the wired transmitter 252 of the router 210B to the ISP Internet access infrastructure 280 which delivers them to their destination.

For demonstrative purposes, wired transmitter 252 and wired receiver 251 of the router 210B are shown as two separate components; however, they may be implemented as a single or unified component, such as, a wired transceiver or a wired transmitter-receiver unit.

For demonstrative purposes, wireless transmitter 253 and wireless receiver 254 of the router 210B are shown as two separate components; however, they may be implemented as a single or unified component, such as, a wireless communications transceiver or a wireless communications transmitter-receiver unit.

For demonstrative purposes, wireless transmitter 273 and wireless receiver 274 of the device 271 are shown as two separate components; however, they may be implemented as a single or unified component, such as, a wireless communications transceiver or a wireless communications transmitter-receiver unit.

In some embodiments, optionally, the downstream packets monitoring unit 212d and the upstream packets monitoring unit 212u may be implemented as a single or unified or bi-directional or an upstream/downstream packets monitoring unit.

In some embodiments, optionally, the downstream packets effector unit 214d and the upstream packets effector unit 214u may be implemented as a single or unified or bi-directional or an upstream-downstream packets effector unit.

Figure 3:
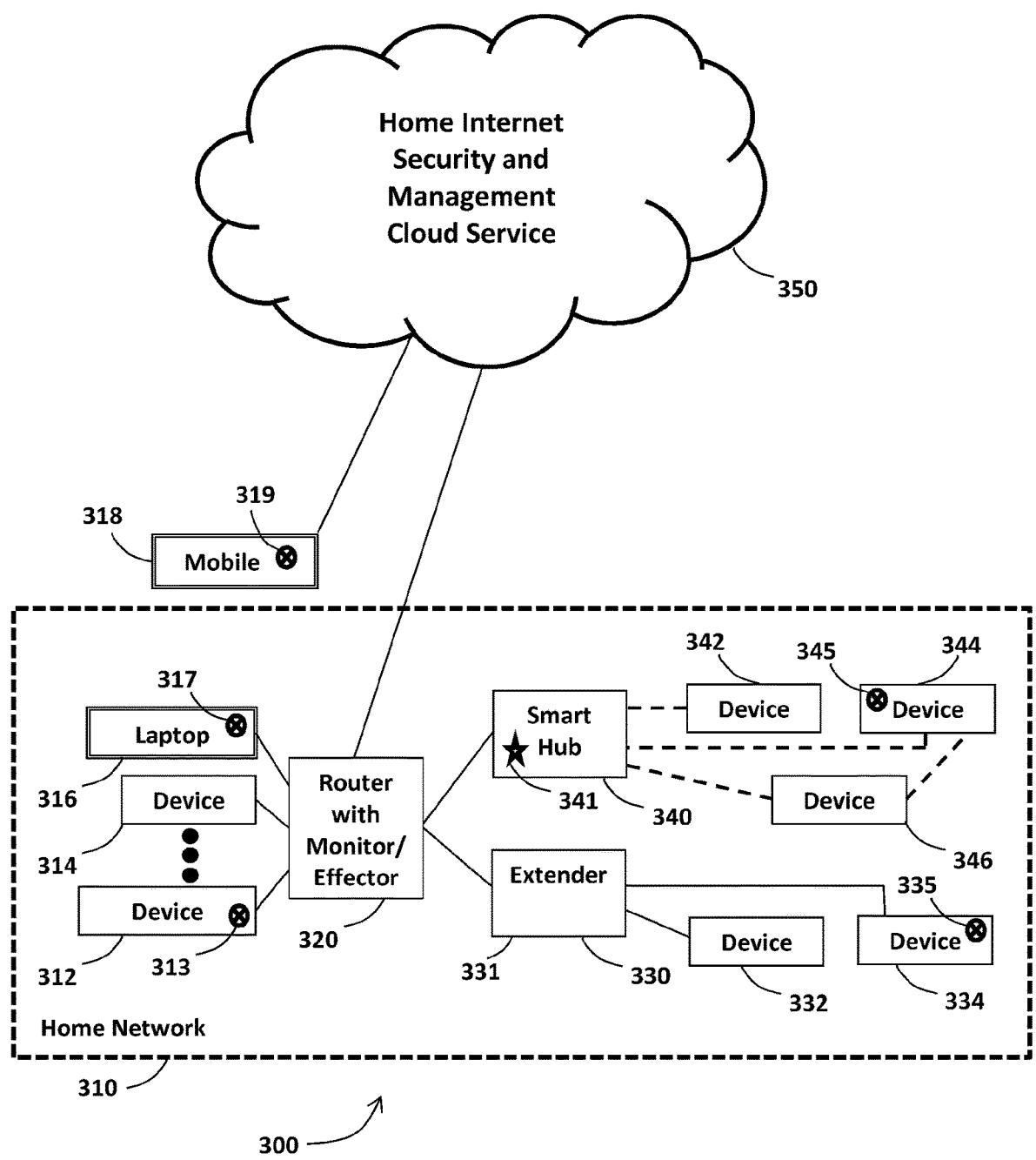
FIG. 3 is a schematic block-diagram illustration of a system demonstrating placement of the home Internet security and management system's components in a demonstrative home-network topology, in accordance with some demonstrative embodiments of the present invention.

Reference is made to FIG. 3, which is a schematic block-diagram illustration of a system 300 demonstrating placement of the home Internet security and management system's components in a demonstrative home-network topology, in accordance with some demonstrative embodiments of the present invention. For example, a router with Monitor/Effector Unit 320 serves a home network 310. The home network 310 comprises or serves various connected devices (312, 314, 316, 332, 334, 342, 344, 346), which are connected to the main router 320 directly or through a switch/hub/bridge/NAT device/other router (330, 340). Some devices (e.g., 342, 344, 346) may not communicate via Wi-Fi, but rather using Zigbee, Z-Wave, Bluetooth, or other communication protocols, and may thus require another networking device 340 in order to reach or access (or communicate with) the main router 320. Some devices (e.g., 344, 346) may optionally communicate directly with one another, not through the home router 320. The user manages the network using his management devices (316, 318), which can manage the home network and view its status even when they are not necessarily connected to the home network 318, such as by directly interacting (e.g., over a cellular communication link) with the Cloud Service 350.

Networking devices (330, 340) may also comprise Monitor/Effector units (331, 341), similar or identical to those present on the main router 320. They may provide security and/or management to their network sub-tree or to the sub-network that they serve, independently of the main router 320, and may even communicate with the Cloud Service 350 (e.g., directly or indirectly). Additionally, they may provide the main router 320 with information on the devices connected to them (e.g., devices 332, 334, 342, 344, 346) and their activities, as these devices may be masked out from the main router's 320 direct view due to the network topology and/or the devices communication protocol (e.g., which may not be directly supported by the main router 320).

Some or all of the devices (312, 316, 318, 334, 344) may comprise an additional security and management component (313, 317, 319, 335, 345), which may provide them with enhanced security and/or assist the main router 320 and/or the networking devices (330, 340) in identifying the relevant device (312, 316, 318, 334, 344) and its traits or characteristics or operational features, such as, its type, its manufacturer, make and model, firmware version, Operating System type and version, available features, activated features, deactivated features, current operational status, or the like.

Figure 4:
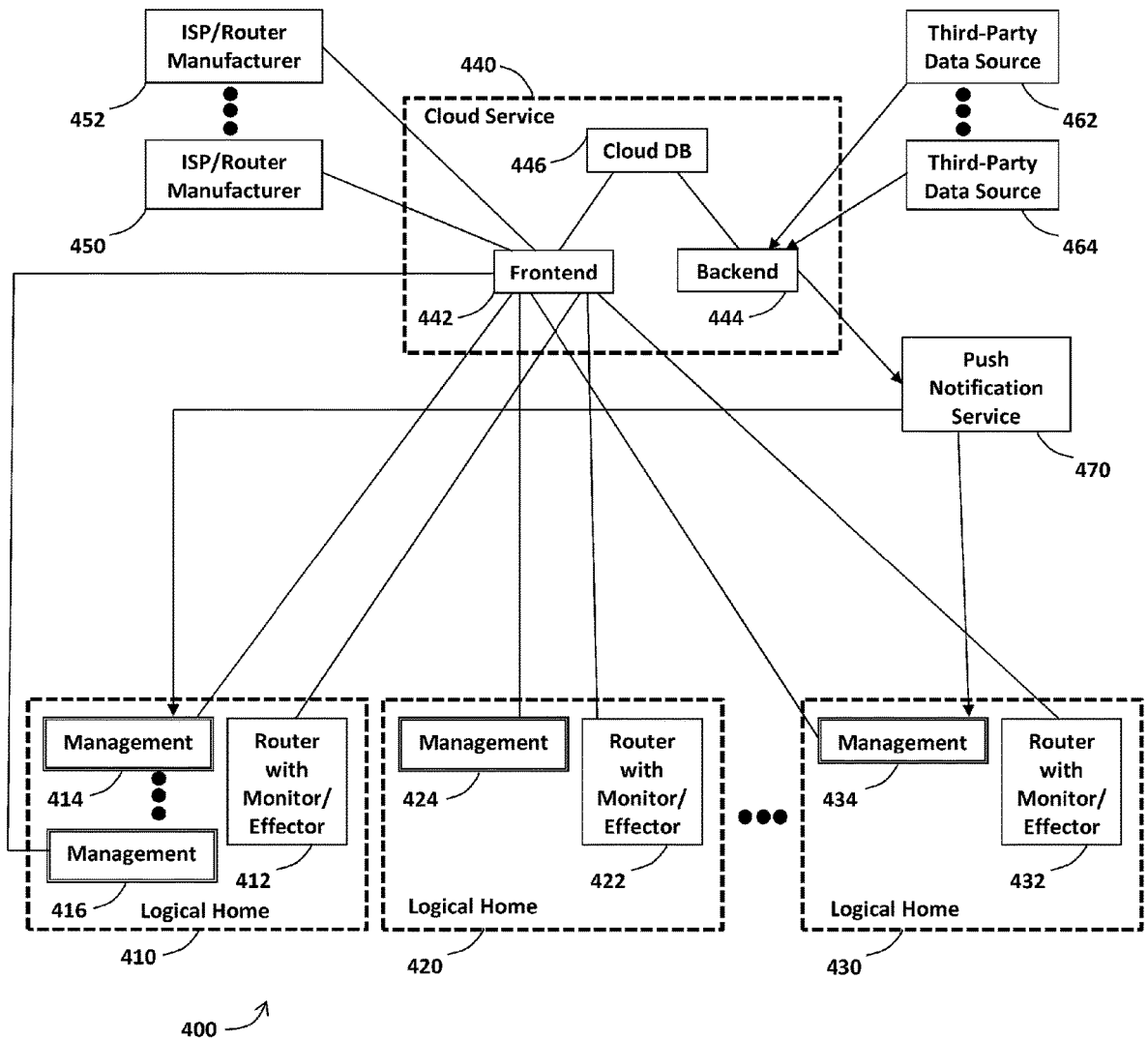
FIG. 4 is a schematic block-diagram illustration of a system demonstrating home Internet security and management utilizing the Cloud Service, in accordance with some demonstrative embodiments of the present invention.

Reference is made to FIG. 4, which is a schematic block-diagram illustration of a system 400 demonstrating home Internet security and management utilizing the Cloud Service, in accordance with some demonstrative embodiments of the present invention. For example, Cloud Service 440 (e.g., implemented by one or more remote servers or cloud-based servers and databases) may comprise multiple components: a Frontend Unit 442, a Backend Unit 444 and a Cloud DB 446.

The Frontend Unit 442 presents users, via their management devices (414, 416, 424, 434), as well as ISPs or router manufacturers or vendors or providers (450, 452), with details and statistics regarding their relevant routers (412, 422, 432) and home devices (410, 420, 430), as stored on the Cloud DB 446. For example, a Logical Home (410, 420, 430) represents all the devices that are connected (or that are potentially connected) to and/or that are managing the home network(s), whether physically located at the home itself or not. A Logical Home (410, 420, 430) may comprise more than one network and/or more than one router (412, 422, 432); and the user's management devices (414, 416, 424,

434) may still be able to manage all the devices and network components through a unified view of the Logical Home (410, 420, 430).

The Frontend Unit 442 may also allow or may receive requests for changing policies on the routers (412, 422, 432) and possibly also updating their software. These requests are stored on the Cloud DB 446 for later processing by the Backend Unit 444. The amount and type of data presented by the Frontend Unit 442, and the actions it allows, are determined using a role-based access control mechanism or other suitable set of rules or criteria for user access control. Additionally, the Frontend Unit 442 receives requests, statistics and notifications from routers (412, 422, 432) installed at homes (410, 420, 430); and all the gathered information is stored in the Cloud DB 446.

The Backend Unit 444 receives threat-intelligence data, URL categorization data, and other data relevant for the operation of the home Internet security and management system, from various third-party data providers (462, 464) or sources or databases or alert-notification sources. The Backend Unit 444 uses the information stored in the Cloud DB 446, including past or historic information, past or historic performance information, past or history or current traffic patterns, current or previous analysis results, current or previous decisions made, and the policy-change and update requests stored in the Cloud DB 446 by the Frontend Unit 442, in order to generate and then provide routers (412, 422, 432) the appropriate responses to their requests, and with tailored or updated policies, local-DBs and other updates. In some embodiments, the data flow between the routers (412, 422, 432) and the Cloud Service 440 may be performed by the Frontend Unit 442.

The Unit Backend 444 may selectively provide notifications to some management devices (e.g., typically to mobile devices, such as devices 414, 434) via a push notification service 470 or via other suitable mechanisms. Notifications may also be provided to management devices (414, 416, 424, 434) via email, SMS, social media, Instant Messaging (IM) applications, and/or any other application or mechanism that may be installed on the management device (414, 416, 424, 434) in connection with the home Internet security and management system or that may otherwise be available for the purpose of contact the home owner or the user of the relevant home network. Notifications may also be sent to ISPs/router manufacturers (450, 452) via similar communication methods.

Figure 5:
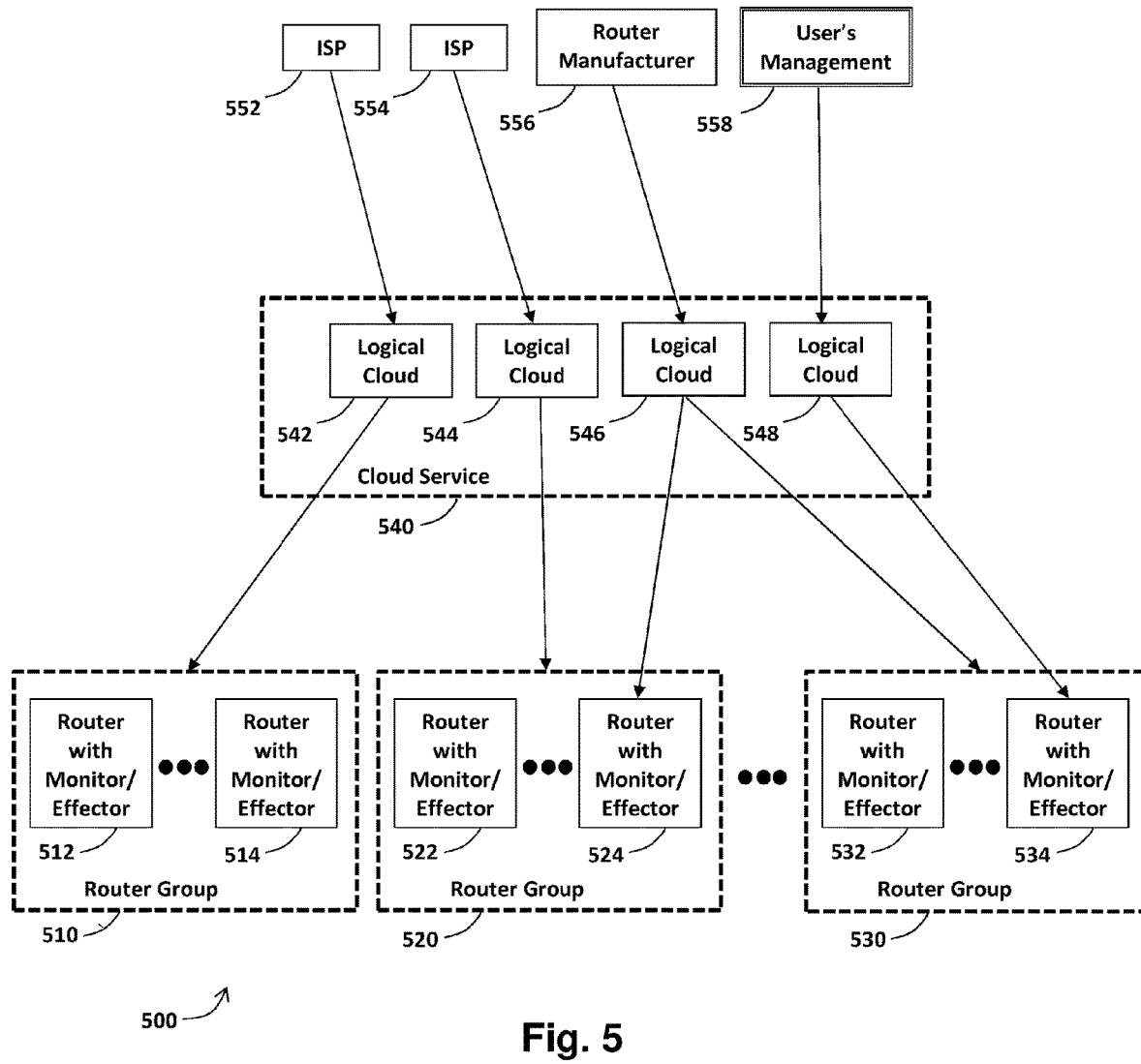
FIG. 5 is a schematic block-diagram illustration of a system demonstrating multiple Logical Clouds that utilize the home Internet security and management Cloud Service, in accordance with some demonstrative embodiments of the present invention.

Reference is made to FIG. 5, which is a schematic block-diagram illustration of a system 500 demonstrating multiple Logical Clouds that utilize the home Internet security and management Cloud Service, in accordance with some demonstrative embodiments of the present invention. For example, home routers (512, 514, 522, 524, 532, 534), on which the Monitor/Effector pair is deployed, correspond to logical groups (510, 520, 530). The logical groups can be based on the ISP that provided the router, the router manufacturer, the make and/or model of the router, the firmware or OS version of the router, the area in which the router is deployed, the geographical area or region, the geographic location, the existence of the lack of existence of a particular device in a particular network, or based on other grouping criteria. In some embodiments, for example, routers (512, 514, 522, 524, 532, 534) may belong to several logical router groups (510, 520, 530).

Similarly, the Cloud Service's Frontend Unit 540 may provide access to multiple Logical Clouds (542, 544, 546, 548), each serving a specific ISP, router manufacturer, user's management device, and so on. The Logical Cloud (542, 544, 546, 548) selectively provides visibility only to the router (512, 514, 522, 524, 532, 534) or group of routers (510, 520, 530) that belong to (or are associated with) the relevant ISP, manufacturer, or user. One or more of the Logical Clouds (542, 544, 546) may be installed or implemented at the corresponding servers or datacenters of the ISP (552, 554) or the router manufacturer 556.

In a demonstrative implementation, for example, an ISP (552, 554) may communicate with a Logical Cloud (542, 544) and view and/or manipulate and/or remotely configure the group of routers (510, 520) that belongs to that particular ISP (552, 554). A router manufacturer 556 may communicate with a Logical Cloud 546 that will grant it access to a series of routers (524, 530), which intersects with a group 520 visible to an ISP 554. A user's management device 558 may use a Logical Cloud 546 to access data and features of his own home router 534.

In accordance with some embodiments of the present invention, a home Internet security and management system may monitor the internal home network (or networks) and its connection to the Internet, for traffic patterns that indicate malicious or unwanted behavior, or for Internet-usage issues or problems or anomalies or irregularities or abnormalities. The system may manipulate or modify or otherwise handle the traffic in real-time or in a delayed fashion, according to preset or predefined or configurable logic or based on a dynamically-updated traffic-handling policy, for purposes that may include, for example, cyber security and protection, parental control, quality of service (QoS), device management, network troubleshooting and internet-connection management. The manipulations or modifications may include connection blocking, content filtering, content insertion, content modification, traffic redirection and bandwidth manipulation. The system may reside on the home router or gateway, whether physical, virtual, or in the cloud, and may be composed of hardware components, software components, or a combination of both. The components may be preinstalled or installed on-demand by the user or a third-party, such as the internet service provider (ISP). Part of the system may be a cloud service that receives statistics and queries from the system's router component and responds with updates and policies. The system may be managed through the home router or through the cloud, and viewing or management access may be provided to the user or to a third-party, such as the ISP. For certain pre-defined events, or when a pre-defined condition is met, or when a policy rule applies, the system may alert the user, log the event, report to an external or remote entity, or perform traffic manipulations or modification. The system may also periodically collect and maintain usage statistics and patterns. For a physical home router, the on-router components may be implemented as lightweight and efficient, especially since a home router's processor or CPU, memory and storage resources may be limited and are largely in use for other purposes.

Figure 6:
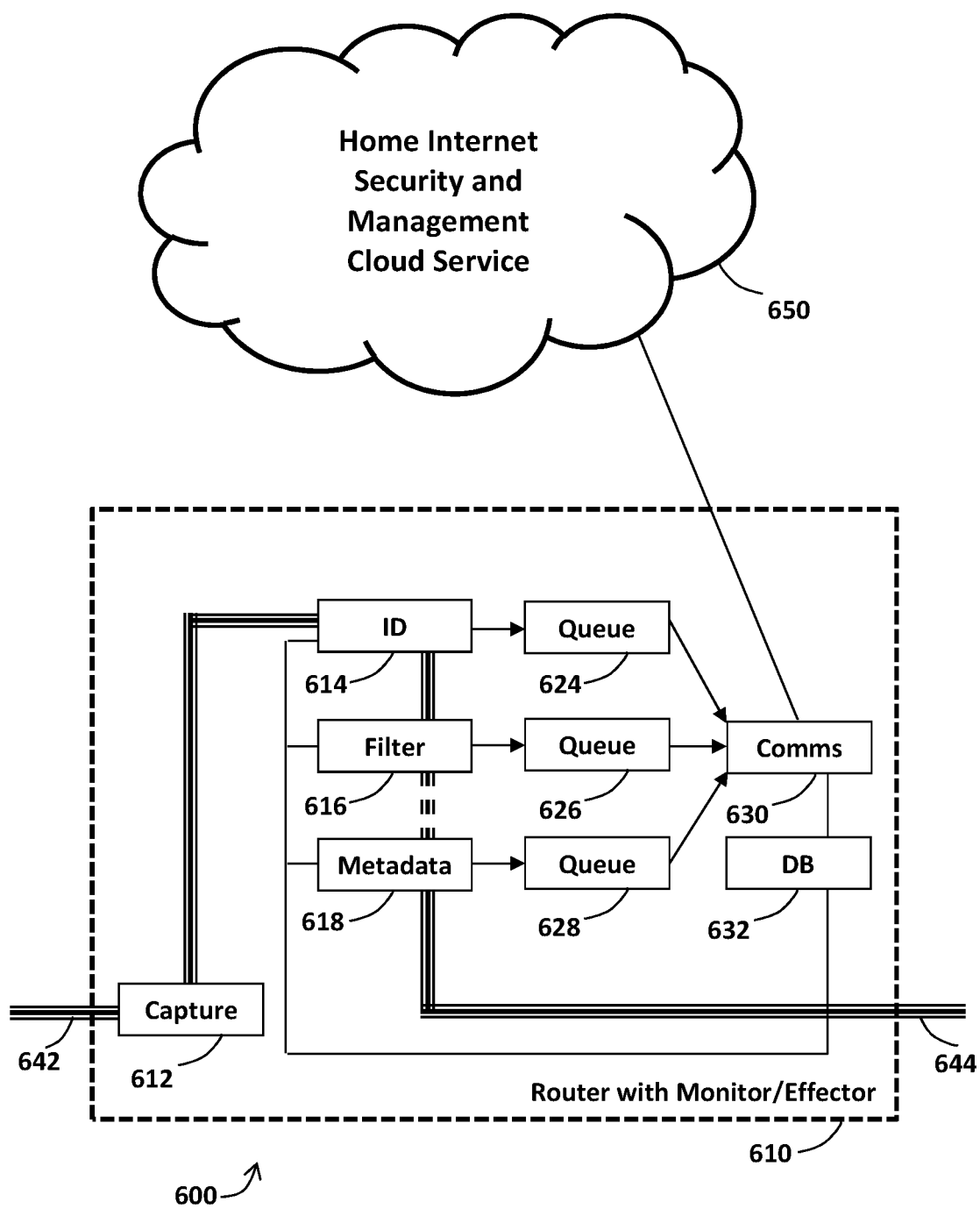
FIG. 6 is a schematic block-diagram illustration of a system demonstrating the home Internet security and management on-router logic, in accordance with some demonstrative embodiments of the present invention.

Reference is made to FIG. 6, which is a schematic block-diagram illustration of a system 600 demonstrating the home Internet security and management on-router logic, in accordance with some demonstrative embodiments of the present invention. For example, a home router 610 is equipped with components (612, 614, 616, 618, 624, 626, 628, 630, 632), which may be implemented as hardware components and/or software components. The location of the components (610, 612, 614, 616, 618, 624, 626, 628, 630, 632) may be at the user's home and/or at the ISPs cloud, as part of the Customer Premises Equipment (CPE), a virtual CPE (vCPE), Network Functions Virtualization (NFV) and/ or Software Defined Networking (SDN). The components (612, 614, 616, 618, 624, 626, 628, 630, 632) may be installed on a pre-existing router 610 that the user already uses, as an addition or extension or plug-in or add-on or accessory and/or as a replacement to the current router's software or hardware or components. These components may be pre-installed on the router 610, or may be installed on-demand by the user or by the relevant ISP/router manufacturer.

Any traffic 642 entering the router (optionally in its role as a communications switch) in any direction (in-in, in-out, out-in) passes through the Capture module 612. The Capture module 612 diverts the normal flow of traffic, and allows other modules (614, 616, 618) to analyze the traffic and manipulate it or modify it or otherwise act on it as necessary or as defined by policy or rules. In some cases, the Capture module 612 may decrypt the TLS data or other encrypted data in order for the other modules to be able to perform Deep Packet Inspection (DPI) as needed, or to allow operations on such traffic in decrypted form. The traffic will be re-encrypted by the last module in the chain, before such traffic 644 leaves the router.

Each module (614, 616, 618) that needs to query or notify the Cloud Service 650 may do so asynchronously, by inserting the relevant event into an appropriate notification queue (624, 626, 628), optionally with an associated priority indicator of the event (e.g., high-priority event; low-priority event). This asynchronous structure allows maximizing the router's 610 performance, especially when resources are limited and when the impact of contacting the cloud synchronously may be unacceptable or non-optimal; otherwise, some queries may be performed synchronously or concurrently or in parallel. The queues (624, 626, 628) are emptied or handled by "workers" or worker modules, working in parallel and residing in the communication module or Comms module 630, which is responsible for communicating with the Cloud Service 650.

The Comms module 630 may have an additional worker module that queries the Cloud Service 650 periodically or on-demand for any policy, configuration, threat-DB or software updates. The data received from the Cloud Service 650 as well as the modules' 614, 616, 618 analysis results are inserted into a shared DB 632, which is used for information purposes and to direct the modules 614, 616, 618 how to act.

The traffic leaving the Capture module 612 continues to the Identification module or to the ID module 614, which operates to identify the home device that is either the source or the destination of this traffic, if it is not already known based on other data. In some embodiments, such analysis and/or identification is performed only in the cloud service; in other embodiments, such analysis and/or identification is performed only in the router; and in yet other embodiments, such analysis and/or identification is performed by one or more units that are located in the cloud service and within the router. Analyzed traffic may include the Dynamic Host Configuration Protocol (DHCP) Options field, the User-Agent field in HTTP(S) requests, DNS queries, or other data or metadata. The ID module 614 also identifies additions, and possibly also removal, of devices to or from the home network. The ID module 614 associates between (i) internal MAC addresses, or any other uniquely identifying information that can be observed in the traffic flow, and (ii) the type of device connected to the home network (mobile phone, laptop computer, IoT device, smart television, sensor, smoke detector, security camera, or the like), its make and model, and any other information that identifies the device (firmware version, OS version, serial number, or the like). Any new information learnt about the device is sent to the queue 624, and eventually delivered to the Cloud Service 650 via the Comms module 630.

The ID module 614 may actively generate traffic, such as inside the home network itself, to allow the ID module 614 to identify the connected devices and their security posture or security status (e.g., including any security vulnerabilities they may have), the network topology, and any other information that may be obtained by sending controlled data (or queries, or probing messages) and observing or analyzing the response, if any. The traffic generated by the ID module 614 may include Address Resolution Protocol (ARP) scans or queries or probes or operations, Network Discovery Protocol (NDP) scans or queries or probes or operations, port scans, network queries, network scans, network probing operations, operating system (OS) fingerprinting scans, or other probing signals or messages or packets. The analyzed results are placed in the appropriate queue 624, and sent through the Comms module 630 to the Cloud Service 650, which uses all the information gathered from the ID module 614 to generate a map of the connected devices (in this particular home network) and their characteristics and features. This map may be used by the system to tailor the updates and responses of the Cloud Service 650 to that specific home network and its particular devices.

From the ID module 614, the traffic flows to the Filter module 616. The Filter module 616 analyzes the traffic flow, consults the policy currently in effect and the results of previous analysis operations (e.g., as saved in the DB 632), and may choose to perform an action. The analysis of traffic may include analysis of the metadata (source/destination, headers), and/or the data itself or the payload (e.g., optionally utilizing deep packet inspection (DPI) or other methods to identify or classify the content delivered).

One category of actions that the Filter module 616 may choose to perform concerns traffic manipulation, which may include connection blocking/teardown, content filtering, content insertion, content modification, traffic redirection, and/or bandwidth manipulation. Other actions may include logging, reporting, generating and sending notifications, and alerting. The analysis and the resulting action(s), if any, may be saved in the DB 632, and may also be communicated by the Comms module 630 to the Cloud Service 650, via the appropriate queue 626. Unless the action results in blocking/ tearing down the connection, the (possibly modified) traffic continues on its way to its (possibly modified) destination, through the Metadata module 618.

In some modes of operation, the Filter module 616 may delay its decision on what action to take, while letting the traffic continue uninterrupted, or may take a series of actions on the same traffic flow, possibly with delays or time-gaps between the actions. For example, the Filter module 616 may allow a new connection, which will subsequently be reported asynchronously to the Cloud Service 650 by the Metadata module 618. The Cloud Service 650 may realize or may determine, using information that is not yet available locally within the router to the Filter module 616, that the new connection is malicious/unwanted and should be blocked, and convey that information to the Comms module 630. The Comms module 630 saves the new information in the DB 632, and triggers the Filter module 616, which may block/tear down the connection immediately based on the new update, or later upon observing new traffic relating to that particular connection. The Filter module 616 may also unauthorize new connections with the same characteristics as those that it was instructed to block (e.g., connections to the same IP address, connections to the same domain or sub-domains of a blocked domain; connections to a first file that resides in the same domain that also hosts a second file that was blocked).

The Metadata module 618 stores and records metadata regarding the traffic, such as the source/destination IP addresses, MAC addresses, TCP ports and sequence numbers, current time, TLS Server Name Indication (SNI), and/or other data; and may also record associations between domains/URLs and their corresponding IP addresses, by analyzing DNS requests/replies. The generated metadata is sent to a queue 628, and eventually to the Cloud Service 650 via the Comms module 630. It may also be saved in the local DB 632, in a processed form and/or in raw format. The metadata is further used to gather usage statistic, observe traffic patterns, and provide QoS data. It may also be used to identify malicious or unwanted connections/traffic.

For performance and scalability reasons, especially when deployed on devices with resource constraints, the Metadata module 618 may only save partial state, or no state at all, locally, and may provide the Cloud Service 650 with sufficient information to construct the complete state. For example, the Cloud Service 650 may be notified when a new TCP connection is established; then, whenever the TCP sequence number crosses certain boundaries or pre-defined threshold (e.g., every 1 megabyte boundary), the Cloud Service 650 is notified, and will associate the traffic statistics information with the connection previously reported. This method does not require saving any local state at all.

When the traffic leaves the Metadata module 618, it continues to its destination (644), uninterrupted.

Figure 7:
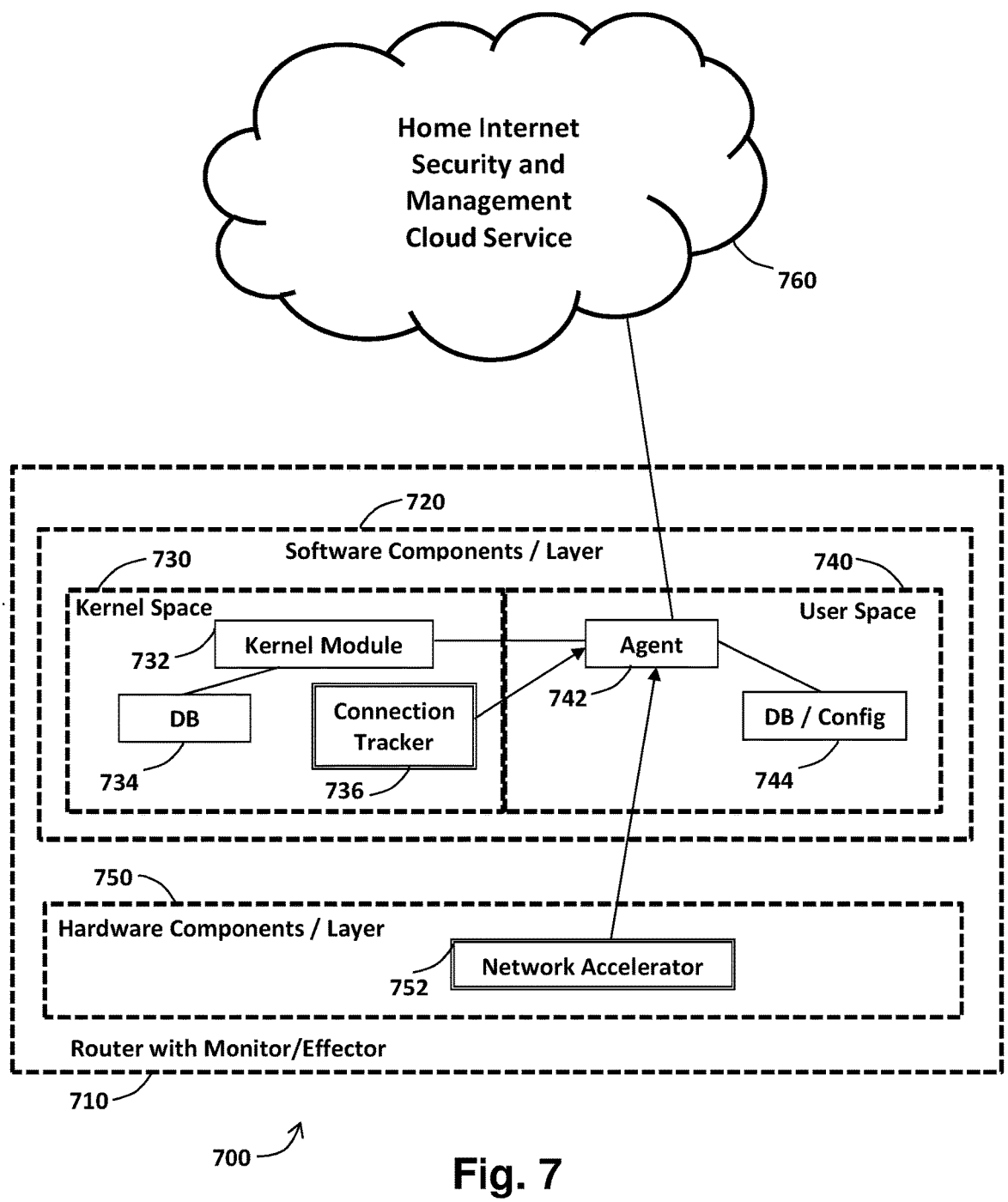
FIG. 7 is a schematic block-diagram illustration of a system demonstrating the home Internet security and management router's main components, in accordance with some demonstrative embodiments of the present invention.

Reference is made to FIG. 7, which is a schematic block-diagram illustration of a system 700 demonstrating the home Internet security and management router's main components, in accordance with some demonstrative embodiments of the present invention. For example, a router 710 is part of the home Internet security and management system, and contains software components or software layer 720 and/or hardware components or hardware layer 750. The software layer 720 may comprise or may be divided into (i) kernel space 730, where the OS and other kernel components run in a CPU privileged mode, and (ii) user space 740, where applications run in a CPU non-privileged mode. In some embodiments, there may be only one CPU privilege, or more than two CPU privileges in use, and so the location of the software components may get shifted in such embodiments. In some embodiments, optionally, the router may implement a container-based architecture, without a conventional separation between kernel space and user space; for example, by having a software module which runs within a contained or sand-boxed or secure or isolated environment with limited or pre-defined privileges and only partial direct access to Operating System services.

The hardware layer 750 may include a network accelerator 752, which offloads some or many or most of the networking procedures from the OS. The network accelerator 752 may allow software components 720 to communicate with it by using an appropriate Application Program Interface (API). The OS may also provide a connection tracker 736 that allows software components to receive information on connections that are managed by the network accelerator 752.

The home Internet security and management system's on-router components (732, 734, 742, 744) may reside both in kernel space 730 and in user space 740. The kernel module 732 is in charge of monitoring, analyzing and affecting network traffic. The kernel module 732 uses a local DB 734 for rapid decision making. Event logs, queries, and statistics are sent from the kernel module 732 to the user-mode agent 742. The user-mode agent 742 may perform further processing on the data, may save information in its own DB 744, and may send event logs, queries, and statistics to the home Internet security and management system's Cloud Service 760. For example, the data that is sent may include the device map and network topology of the home network, indications of blocked threats, and associations between domain names/URLS and IP addresses. The agent 742 may also query the connection tracker 736, or may utilize the network accelerator's 752 API, to collect statistics regarding the network traffic and to send them to the Cloud Service 760. The statistics collected from the kernel module 732, the connection tracker 736, and the network accelerator 752, may include the bandwidth utilized by each device, and the throughput and latency for each connection.

On the receiving side, the agent 742 receives replies, updates, configuration changes, and commands from the Cloud Service 760. The agent 742 may save the data to its local DB 744 and/or may send the data to the kernel module 732, which may save it in its own local DB 734 for rapid future access. The data received from the cloud may include software updates for the on-router components, policy change requests or commands (e.g., blocking traffic for specific devices or connections at certain dates and times), updates to white-list or black-list of items or URL or destinations or domains or sub-domains or file-types, and DBs or lists of threat indicators or vulnerabilities that require monitoring. The agent's 742 polling from the Cloud Service 760 may occur synchronously or asynchronously, via serial or parallel execution, periodically or on-demand, or by any suitable combination of these methods. For efficiency reasons, some or most of the communication may be performed asynchronously and/or via parallel execution.

In accordance with the present invention, a home Internet security and management system may monitor the internal home network (or networks) and its (or their) connection to the Internet, for traffic patterns that indicate malicious or unwanted behavior, or for Internet-usage issues or problems or irregularities or anomalies. The system may manipulate or handle or modify the traffic in real-time or in a delayed fashion, according to preset or configurable logic or rules or criteria or policy. The system may reside on the home router/gateway, whether physical, virtual, or in the cloud; and may comprise hardware components and/or software components. The components may be preinstalled, or may be installed on-demand by the user or a third-party, such as the internet service provider (ISP). Part of the system may be a cloud service that receives statistics and queries from the home router, and responds with updates as well as and policies and rules for enforcement in the home network via the home router. The system may be managed through the home router or through the cloud, and viewing or management access may be provided to the user or to a third party, such as the ISP. The system may support seamless installation and activation procedures on customer premises equipment (CPE), particularly on a wireless router for home users. The procedures may be performed in an independent fashion by the user, or in concert with the ISP, as part of the services provided by the ISP. The procedures may include, for example: creating an account; registering the account with the ISP; installing the on-router components of the home Internet security and management system; running or launching or initiating the on-router components; and activating the service provided by the system. This solution may include components that are to be installed and activated on the home router, thereby enabling a simple and rapid way for the user, as well as for the ISP, to install the components, register them, activate them, and run them.

Some embodiments provide a system and a method for initiation of home device management via a router. For example, a home Internet security and management system may utilize the home router as part of its components. The system comprises a management agent, on-router components (e.g., monitor unit and effector unit), and a cloud-based management service. The on-router components are typically lightweight and are implemented using efficient components that are installed in the home router/gateway.

Embodiments of the present invention may operate in two main scenarios for activating the on-router components.

In a first scenario, the user installs and activates the on-router components independently of the ISP, which may not be at all part of the Internet security and management services. In this first scenario, the home Internet security and management service is not provided by the ISP; and the home router need not necessarily be associated with the ISP. The user, via the services management agent, is responsible for creating an account with the security and management service provider and for initiating the necessary steps for installing and running the on-router components on an existing home router. The steps mostly run automatically, without the user's intervention, except for some credentials that the user may need to supply to the management agent.

In a second scenario, the Internet security and management services are provided by the ISP (and/or in collaboration with third parties); the ISP pre-installs the on-router components within the router in a deactivated mode; and the user later activates the services by requesting from the ISP to activate these services. In this second scenario, the home Internet security and management system is provided as a service (e.g., an added-value service, a premium service, a paid service) by the ISP, optionally in collaboration with other entities. The ISP requires the user to have a router that is provided or supported by the ISP. The ISP installs or pre-installs the on-router components by itself, for example, via a firmware update, a distribution mechanism or management protocol such as TR-069, or in factory, or manually by a technician, or via any other suitable manner. The ISP may also fit or equip the router with a dedicated management communication channel, to be used by the ISP for the purpose of remotely performing management operations towards this router. The user, via the management agent, requests the ISP to activate the on-router components and to provide the home Internet security and management service.

Figure 8:
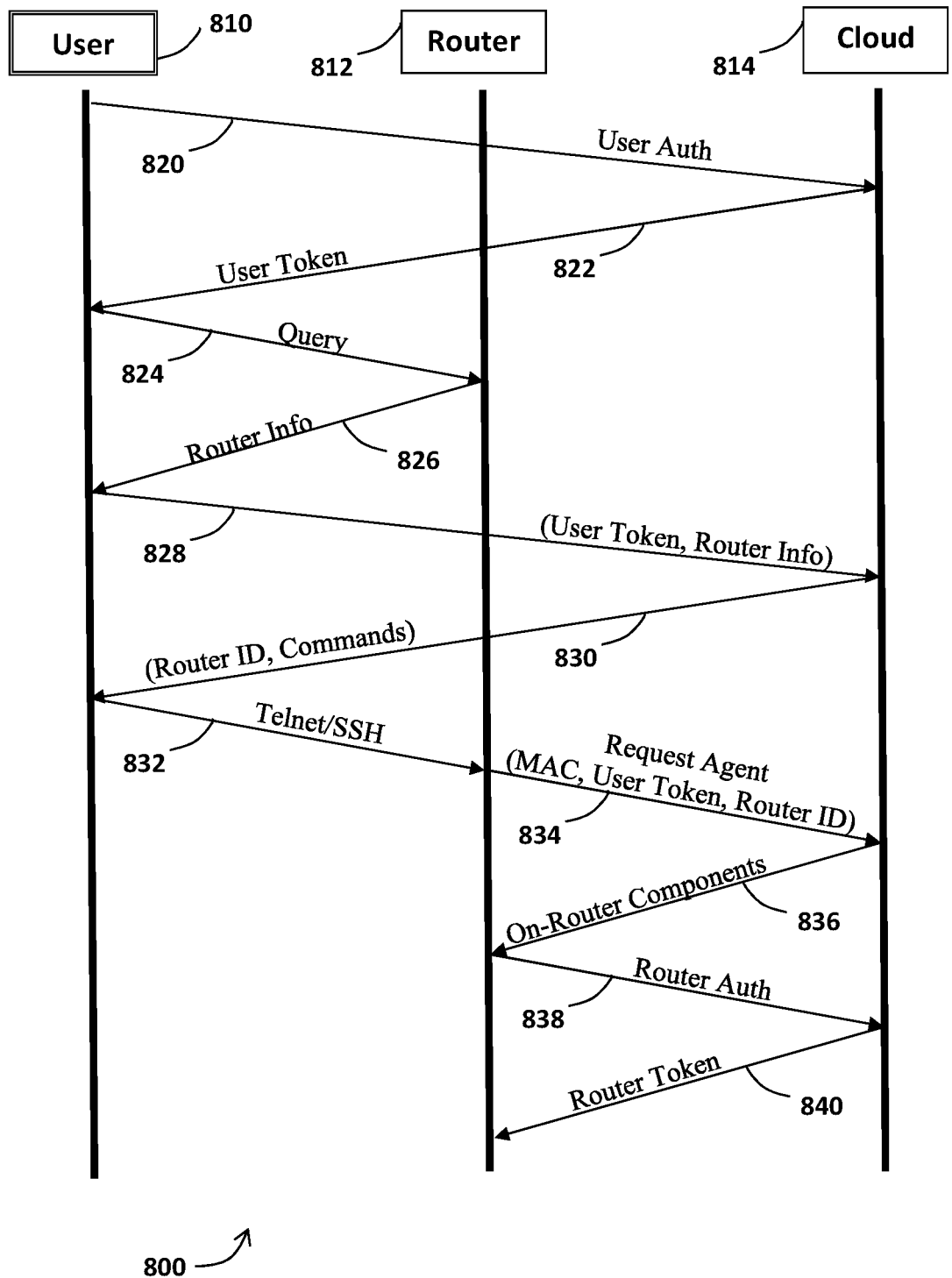
FIG. 8 is a diagram demonstrating a method of installation and initiation for the home Internet security and management system's on-router components, in accordance with some demonstrative embodiments of the present invention.

Reference is made to FIG. 8, which is a diagram 800 demonstrating a method of installation and initiation for the home Internet security and management system's on-router components, in accordance with some demonstrative embodiments of the present invention. For example, three communicating entities may be the user's management device 810, the router 812 (on which the monitor/effector unit is to be installed), and the Cloud Service 814 of the home Internet security and management system. The user's management device 810 may be a mobile device, such as a mobile phone, a tablet, a smart wearable, or the like, or a desktop computer or laptop computer, whether physical or virtual.

The user may firstly download and install the management agent on the management device 810. The management agent may be downloaded from a website or from an "app store" or other online destination or repository, or may be received through email, or via social media interactions or IM applications, or may be delivered physically to the user, on a thumb drive or a Flash drive or a CD or other suitable media. It may also be preinstalled on the management device 810, or may be shipped with the router 812. All communication with the Cloud Service 814 are encrypted, such as via TLS/HTTPS or by other suitable methods. Furthermore, the Cloud Service 814 may be authenticated using a certificate.

Diagram 800 demonstrates the algorithmic flow of installing and activating on-router components on router 812 for the first time, independently of any ISP. This may be the first time that the user 810 ever uses the management application; or it may be an addition or replacement of router 812 on the home network, or it may be the addition of router 812 for a different home network than previously managed by the user's management device 810, e.g., when the user 810 manages both his home and his parents' home.

The user logs in to the system 820, by authenticating himself to the Cloud Service 814. The user 810 may create a new account in the system, or may use an account they previously created in the system, or log in using credentials for third-party accounts, such as social media and email accounts. After a successful authentication phase 820, the server 814 replies with a token 822, uniquely identifying the user.

For the next stages, the user's management device 810 should be able to access the router's 812 management infrastructure. This may be performed by residing on the same network, whether virtually or physically, or via other means, such as enabling remote access to a device connected to the router 812. Once access to the router is ensured, the user's management device 810 identifies the location of the router 812 on the network, possibly through information obtained using DHCP or from static addresses provided by the user or in a configuration file. The management device 810 then queries 824 the router 812 using one or more methods, which may include HTTP and/or SNMP queries, in order to obtain a unique "fingerprint" of the router 812, which may include its make and model, and/or its network interface card (NIC) MAC address. The unique "fingerprint" is obtained through an analysis of the router's 812 replies 826.

The previously received user token 822 and router info 826 are sent 828 to the Cloud Service 814, thereby creating the association between the user 810 (and his account) and the router 812, and effectively registering the router 812 and its corresponding home network in the cloud-based system. The Cloud Service 814 updates an internal database (DB), and replies with a router ID 830 that uniquely identifies this association, and thus uniquely identifies the particular router 812 itself. Additionally, the reply 830 from the Cloud Service 814 may include information on part or all of the installation procedure/commands that are required or proposed for that specific router 812; for example, such procedure or commands obtained from a database or list of pre-defined sets of commands that are suitable for various routers having a make-and-model identifier or being of a particular type or make or model.

The management device 810 initiates an SSH connection or a telnet connection (e.g., if SSH is unavailable) 832 to the router 812. If neither the SSH nor the telnet services are active on the router 812, then the user's management device 810 attempts to activate them. As the credentials for logging into the router 812, the management device 810 first tries to use pre-defined or generic login/password combinations (e.g., "admin" and "admin"), as pre-supplied in the management app 810, or as received 830 from the Cloud Service 814, specifically for that router's 812 make and model. If the generic login/password combination(s) fail, the management agent 810 may request the user to manually supply it with the router's 812 credentials. In some cases, the management agent 810 may ask the user to supply it with a picture of the label or sticker or barcode or other identifier article that accompanies the router 812 (e.g., residing on the back of the router, or under the router, or in its user's manual), and may use optical character recognition (OCR), barcode scanning, or similar methods to extract the necessary credentials.

When a telnet/SSH connection is successfully established 832, the management device 810 sends or runs a series of commands on the router 812, and such commands are executed by the router 812, in order to download the on-router components from the cloud service 814 and install them in the router 812. The series of commands may include information obtained from the Cloud Service 830. First, an attempt is made to use downloading tools such as wget and curl, if they exist (e.g., installed, available) on the router. If no relevant downloading tool exists on the router, the management device 810 uploads a lightweight downloader module to the router 812, to be used in the agent downloading stage only. The downloader connects 834 to the Cloud Service 814 using the router's 812 MAC address, the previously supplied user token 822 and the router ID 830, and downloads the on-router components 836, which may consist of kernel components, user-mode components, configuration files, installation scripts, and/or other relevant piece of code or data-items or commands or parameters. The received code/data components 836 or data-items may be specific for that particular router 812, or may be class-wide commands or code or data that are suitable for a class (or type) of routers.

Following the downloading of the on-router components 836, the management device 810 sends commands to the router 812 via the active SSH/telnet connection 832, to configure, install and run the on-router components. Some or all of the commands used in this phase may have originated (e.g., 830, 836) from the Cloud Service 814, and may include installation instructions, enabling/disabling services on the router 812, changing the router's 812 configuration, modifying values of parameters within the router 812, changing a function parameter within the router from "deactivated" to "activated" (or vice versa), or the like.

Once the agent starts running on the router 812, it authenticates itself 838 to the Cloud Service 814 using the previously received router ID 830 and the router's 812 MAC address, and receives its own communication token 840, to be used in further correspondence between the router 812 the Cloud Service 814. The system is then fully operational, and the router 812 can continue requesting updates from the Cloud Service 814, filtering traffic according to the user's 810 policy, and/or perform other operations. Uninstallation or deactivation of the on-router components may be performed using a similar process to the one presented in the diagram 800.

Figure 9:
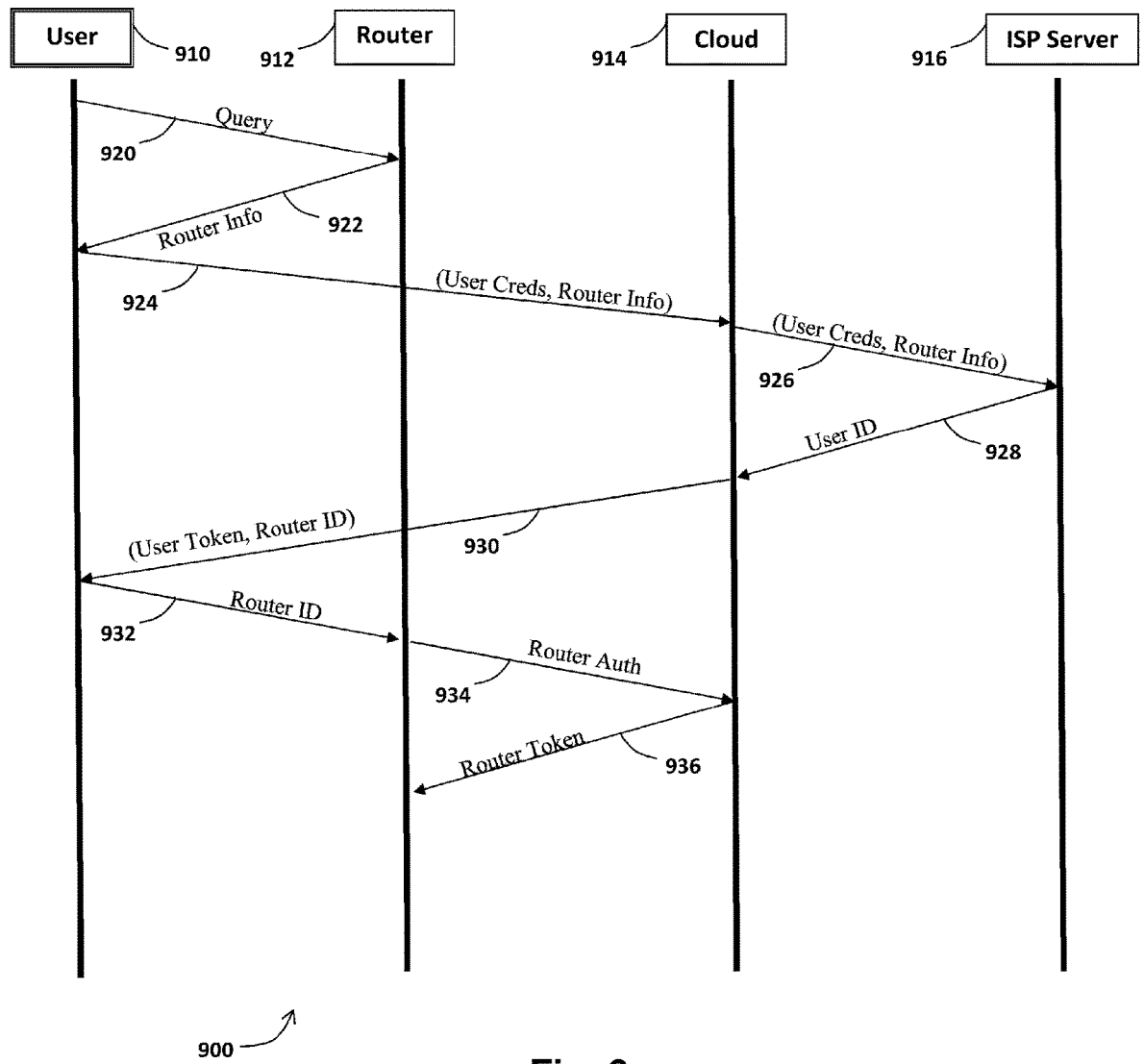
FIG. 9 is a diagram demonstrating a user or an ISP activation procedure for the home Internet security and management system's on-router components, in accordance with some demonstrative embodiments of the present invention.

Reference is made to FIG. 9, which is a diagram 900 demonstrating a user or an ISP activation procedure for the home Internet security and management system's on-router components, in accordance with some demonstrative embodiments of the present invention. For example, four communicating entities are: the user's management device 910; the router 912, which was supplied to the user by the ISP; the Cloud Service 914 of the home Internet security and management system; and the ISP Server 916, which is part of the ISP's infrastructure, and logically connects between the ISP and the home Internet security and management system.

The router 912 may already contain the on-router components of the home Internet security and management system, but they are not activated yet; such as, they are already pre-installed within the router, but a configuration file or parameters within the routers store a value of "disabled" or "deactivated" for such parameters or for particular features. The on-router components were installed on the router 912 by the ISP or an affiliate thereof, whether by a firmware update, a distribution mechanism or management protocol such as TR-069, in factory, manually by a technician, or via any other suitable manner. Additionally, the ISP or an affiliate thereof may fit the router 912 with a dedicated management communication channel, to be used with the management device 910.

The user's management device 910 could be a mobile device, such as a mobile phone, a tablet, a smart wearable, and so on, or a desktop computer/laptop, whether physical or virtual. The user first needs to download and install the management agent on the management device 910. The management agent may be unique to the ISP providing the Internet service and the router 912, and may be downloaded from a website or from an app store, received through email, social media interactions or IM apps, or be delivered physically to the user, on a thumb drive or a CD, for example. It may also be preinstalled on the management device 910 or get shipped with the router 912. All communications with the Cloud Service 914 and the ISP Server 916 are encrypted, via TLS/HTTPS or by other methods. Furthermore, the Cloud Service 914 and the ISP Server 916 can be authenticated using a certificate.

Diagram 900 demonstrates the algorithmic flow of activating preinstalled on-router components on a router 912, by way of an ISP 916 granting access to the home Internet security and management service it supplies. The user's management device 910 should be able to access the router's 912 management infrastructure. This may be performed by residing on the same network, whether virtually or physically, or via other means, such as enabling remote access to a device connected to the router 912.

Once access to the router is available, the user's management device 910 identifies the location of the router 912 on the network, possibly through information obtained using DHCP or from static addresses provided by the user or in a configuration file. The management device 910 then queries 920 the router 912 using one or more methods, which may include HTTP and/or SNMP queries, or a special query on the dedicated management communication channel, in order to obtain a unique "fingerprint" of the router 912, which may include its make and model, its serial number, its network interface card (NIC) MAC address, and any ID supplied by the ISP to the router 912. The unique "fingerprint" is obtained through an analysis of the router's 912 replies 922.

In order to request the ISP to activate the home Internet and management system, the user's management device 910 sends the obtained router information 922 to the Cloud Service 914, along with any credentials that the ISP may require the user to use for authentication. These may include a username and a password, and optionally also personally identifiable information (PII) such as account number at the ISP, name of the user or account owner, or the like. The Cloud Service 914 verifies that the service is not already activated for the specific user and router 912. If the service is already activated for that user and router 912, then the Cloud Service 914 sends to the user's management device 910 the user token and router ID relevant for that activation 930, as described below. If the service is not currently active, the Cloud Service 914 forwards the activation request 926 to the ISP Server 916, which interacts with internal ISP systems and databases, such as customer relationship management (CRM) and billing systems.

The ISP Server 916 validates that the user is a customer of the ISP, that the router is compatible with the ISP or supplied by it, and that the user is allowed to activate the service for that router (e.g., such allowance or authorization may be conditioned upon the user paying a fee to the ISP). If any of the checks fails, then the flow is terminated and the service is not activated. If all the checks pass, then the ISP Server 916 updates the internal systems to indicate that the service is active and that the user should be billed accordingly, and replies back 928 to the Cloud Service 914 with a user ID that identifies the user for that ISP, with respect to the home Internet security and management system.

Upon receiving the ISP's user ID 928, the Cloud Service 916 creates a new user ID in the home Internet security and management service database, and associates it with the ISP's received user ID 928 and with the router's 912 info (e.g., MAC address), as previously received 924 from the management device 910. A router ID is also created and saved as part of the association, to be able to authenticate the router's 912 identity in future communication requests originating from the router 912. The Cloud Service 916 creates a unique user token to authenticate the user's management device 910, and associates it with the same user record.

Once all data is created and saved, the Cloud Service 914 sends the user token and router ID 930 to the management device 910. The management device 910 saves the user token internally, and uses it for authentication in further communication with the Cloud Service 914, i.e., the user token serves a purpose similar to common credentials when logging in; and the Cloud Service 914 denies any login attempts that merely try to use the generated user ID (with or without a password).

The management device 910 communicates with the router 912 using the dedicated management channel, or via any other communication method defined by the ISP, and sends 932 the router ID to the router 912, as previously obtained 930 from the Cloud Service 914. The router 912 saves the received router ID 932 in permanent storage, and activates the on-router components, belonging to the home Internet security and management system.

Once the agent starts running on the router 912, it authenticates itself 934 to the Cloud Service 914 using the previously received router ID 932 and the router's 912 MAC address or any other unique ID configured by the ISP or an affiliate thereof on that router, and receives its own communication token 936, to be used in further correspondence between the router 912 the Cloud Service 914. The system is then fully operational, and the router 912 can continue requesting updates from the Cloud Service 914, filtering traffic according to the user's 310 policy, and/or perform other operations. Deactivation or disabling of the on-router components may be performed using a similar process to the one presented in diagram 900.

In some embodiments, an apparatus comprises: a wireless communication router, (a) to receive via a wired link downstream TCP/IP packets from the Internet and to wirelessly transmit the downstream TCP/IP packets to one or more Internet-connected devices over one or more wireless communication links, and (b) to wirelessly receive from said one or more Internet-connected devices upstream TCP/IP packets over said one or more wireless communication links and to send the upstream TCP/IP packets to the Internet via said wired link. The wireless communication router comprises a monitoring and effecting unit, (A) to monitor the downstream TCP/IP packets, and (B) to monitor the upstream TCP/IP packets, and (C) to enforce a traffic-related policy on at least one of: the downstream TCP/IP traffic, the upstream TCP/IP traffic.

In some embodiments, the monitoring and effecting unit is to block a particular set of the downstream TCP/IP packets based on said traffic-related policy. In some embodiments, the monitoring and effecting unit is to block a particular set of the upstream TCP/IP packets based on said traffic-related policy. In some embodiments, the monitoring and effecting unit is to perform bandwidth limiting, based on said traffic-related policy, of at least one of: the downstream TCP/IP traffic, the upstream TCP/IP traffic. In some embodiments, the monitoring and effecting unit is to perform traffic filtering, based on said traffic-related policy, of at least one of: the downstream TCP/IP traffic, the upstream TCP/IP traffic. In some embodiments, traffic steering, routing, re-routing, or re-directing may be performed; for example, steering or rerouting upstream traffic that was originally destined to a first destination, such that the traffic would reach a second, different, destination; or such that downstream traffic that was originally destined to a first Internet-connected device, would be blocked or would be quarantined or would reach a second, different, Internet-connected device.

In some embodiments, traffic may be selectively delayed or quarantined (e.g., may remain in an isolated memory unit of the home router, rather than being immediately delivered to the Internet-connected device if it is downstream traffic, or rather than being immediately sent to the Internet destination if it is upstream traffic), until such quarantined or delayed or on-hold traffic is released by a user (e.g., by a parent who defined a parental control rule, to quarantine any traffic from a laptop of a child towards a particular social networking website, or to quarantine any JPG or PNG files from being delivered downstream to said laptop, or the like). For this purpose, the monitoring and effecting unit may comprise or may control a traffic quarantine unit, able to isolate and store such quarantined items or data, able to release them upon receiving the required credentials or approval, able to discard them within a pre-defined time period, able to notify a particular user (e.g., a parent) that an item or that data is quarantined and optionally able to provide data attributes or data preview, or the like.

In some embodiments, the monitoring and effecting unit is to enforce a parental control rule of said traffic-related policy, on at least one of: the downstream TCP/IP traffic, the upstream TCP/IP traffic. The enforcement of the parental control rule, performed and enforced by the wireless router, may be selectively enforced with regard to only a particular Internet-connected device (e.g., a laptop typically utilized by a child), based on parental control rules.

In some embodiments, the monitoring and effecting unit is to replace a particular set of downstream TCP/IP packets with a set of replacement TCP/IP packets, based on said traffic-related policy. In some embodiments, the monitoring and effecting unit is to replace a particular set of upstream TCP/IP packets with a set of replacement TCP/IP packets, based on said traffic-related policy. In some embodiments, the monitoring and effecting unit is to block access of said one or more Internet-connected devices to a particular Internet location, based on said traffic-related policy.

In some embodiments, the one or more Internet-connected devices comprise at least: a first Internet-connected device of a first device-type, and a second Internet-connected device of a second device-type; wherein the monitoring and effecting unit is (a) to block access of the first Internet-connected device to a particular Internet location, based on a first rule in said traffic-related policy which applies to said first device-type, and (b) to authorize access of the second Internet-connected device to said particular Internet location, based on a second rule in said traffic-related policy which applies to said second device-type.

In some embodiments, the monitoring and effecting unit is to perform Deep Packet Inspection (DPI) of at least one of: the downstream TCP/IP traffic, the upstream TCP/IP traffic; and based on said DPI, to determine whether or not to block access of at least one Internet-connected device to a particular Internet location.

In some embodiments, the one or more Internet-connected devices comprise at least: a first Internet-connected device of a first device-type, and a second Internet-connected device of a second device-type; wherein the monitoring and effecting unit comprises a device-identification unit, (a) to analyze the downstream TCP/IP packets, (b) to determine that a first group of downstream TCP/IP packets are destined to said first Internet-connected device, (c) to determine that a second group of TCP/IP packets are destined to said second Internet-connected device, (d) to authorize said wireless communication router to wirelessly transmit the first group of downstream TCP/IP packets to said first Internet-connected device, (e) to unauthorize said wireless communication router to wirelessly transmit the second group of downstream TCP/IP packets to said second Internet-connected device.

In some embodiments, the one or more Internet-connected devices comprise at least: a first Internet-connected device of a first device-type, and a second Internet-connected device of a second device-type; wherein the monitoring and effecting unit comprises a device-identification unit, (a) to analyze the upstream TCP/IP packets, (b) to determine that a first group of upstream TCP/IP packets originate from said first Internet-connected device, (c) to determine that a second group of TCP/IP packets originate from said second Internet-connected device, (d) to authorize said wireless communication router to relay the first group of upstream TCP/IP packets towards their destination based on the identification of their source as the first Internet-connected device, (e) to unauthorize said wireless communication router to relay the second group of upstream TCP/IP packets to their destination based on the identification of their source as said second Internet-connected device.

In some embodiments, the monitoring and effecting unit comprises a device-identification unit, (a) to perform analysis of the upstream TCP/IP packets and the downstream TCP/IP packets, and (b) based on said analysis, to determine that at a first time-point, a wireless communication network served by said wireless communication router included a first number of Internet-connected device; and (c) based on said analysis, to determine that at a second time-point, said wireless communication network served by said wireless communication router included a second, different, number of Internet-connected device; (d) to trigger said wireless communication router to notify an Internet Service Provider (ISP) that provides Internet traffic to said wireless communication router, that there is a change in the number of Internet-connected devices that are included in said wireless communication network served by said wireless communication router.

In some embodiments, the monitoring and effecting unit comprises a device-identification unit, (a) to perform analysis of the upstream TCP/IP packets and the downstream TCP/IP packets, and (b) based on said analysis, to determine that a wireless communication network served by said wireless communication router comprises at least: a first Internet-connected device of a first device-type, and a second Internet-connected device of a second device-type; and (c) to trigger said wireless communication router to send a notification to an Internet Service Provider (ISP) that provides Internet traffic to said wireless communication router, wherein said notification indicates at least the first device-type and the second device-type.

In some embodiments, the monitoring and effecting unit comprises a device-identification unit, (a) to perform analysis of the upstream TCP/IP packets and the downstream TCP/IP packets, and (b) based on said analysis, to determine that a wireless communication network served by said wireless communication router comprises at least: a first Internet-connected device of a first device-type, and a second Internet-connected device of a second device-type; and to trigger said wireless communications router (I) to enforce a first traffic-related policy with regard to traffic that is sent by or destined to devices of said first device-type, and (II) to enforce a second, different, traffic-related policy with regard to traffic that is sent by or destined to devices of said second device-type.

In some embodiments, the monitoring and effecting unit comprises a device-identification unit, (a) to perform an Address Resolution Protocol (ARP) scan analysis which determines that a wireless communication network served by said wireless communication router comprises at least: a first Internet-connected device of a first device-type, and a second Internet-connected device of a second device-type; wherein the monitoring and effecting unit triggers said wireless communications router (I) to enforce a first traffic-related policy with regard to traffic that is sent by or destined to devices of said first device-type, and (II) to enforce a second, different, traffic-related policy with regard to traffic that is sent by or destined to devices of said second device-type.

In some embodiments, the monitoring and effecting unit comprises a device-identification unit, (a) to perform analysis of the upstream TCP/IP packets and the downstream TCP/IP packets, and (b) based on said analysis, to determine that a wireless communication network served by said wireless communication router comprises at least: a first Internet-connected device of a first device-type, and a second Internet-connected device of a second device-type; wherein the monitoring and effecting unit triggers said wireless communications router (I) to enforce a first traffic-filtering policy with regard to traffic that is sent by or destined to devices of said first device-type, and (II) to enforce a second, different, traffic-filtering policy with regard to traffic that is sent by or destined to devices of said second device-type.

In some embodiments, the monitoring and effecting unit is pre-installed in a disabled mode in said wireless communication router; wherein said wireless communication router is (I) to receive an activation signal, initiated by an electronic device of a user of said wireless communication router; and (II) in response to said activation signal, to change said monitoring and effecting unit from being in said disabled mode to being in an enabled mode.

In some embodiments, the monitoring and effecting unit is pre-installed in a disabled mode in said wireless communication router; wherein said wireless communication router is (I) to receive an activation signal, initiated by an electronic device of a user of said wireless communication router; and (II) in response to said activation signal, to change said monitoring and effecting unit from being in said disabled mode to being in an enabled mode; wherein said activation signal is received over said wired communication link, from an Internet Service Provider (ISP) that provides Internet access to said wireless communication router.

In some embodiments, the monitoring and effecting unit is dynamically installed into said wireless communication router after said wireless communication router is deployed at a consumer venue, based on an installation signal that triggers a download agent within said wireless communication router to download code that corresponds to functionalities of said monitoring and effecting unit.

In some embodiments, the wireless communication router is connected directly to infrastructure of an Internet Service Provider (ISP), via a link that excludes a firewall and excludes traffic-filtering units.

In some embodiments, the monitoring and effecting unit is to enforce a user-defined rule that selectively blocks intra-network communication between (i) a first particular Internet-connected device, and (ii) a second particular Internet-connected device.

In some embodiments, the monitoring and effecting unit is to enforce a pre-defined rule that selectively blocks intra-network communication between (i) a first particular type of Internet-connected devices, and (ii) a second particular type of Internet-connected devices.

In some embodiments, the monitoring and effecting unit is to selectively block intra-network communication between (i) a first particular type of Internet-connected devices, and (ii) a second particular type of Internet-connected devices, based on Deep Packet Inspection (DPI) analysis of traffic within said network.

In some embodiments, the monitoring and effecting unit is to selectively block communication from or to said wireless communication router, based on said traffic-related policy.

In some embodiments, the monitoring and effecting unit is to selectively block Internet traffic based on a geographic location in which said apparatus is located.

In some embodiments, the monitoring and effecting unit is to selectively block Internet traffic based on a particular type of Internet-connected device that is connected within said network.

In some embodiments, the monitoring and effecting unit is to selectively block only a particular type of Internet traffic based on said traffic-related policy.

In some embodiments, a method comprises: in a wireless communication router, (a) receiving via a wired link downstream TCP/IP packets from the Internet, and wirelessly transmitting the downstream TCP/IP packets to one or more Internet-connected devices over one or more wireless communication links; (b) wirelessly receiving from said one or more Internet-connected devices upstream TCP/IP packets over said one or more wireless communication links, and sending the upstream TCP/IP packets to the Internet via said wired link; (c) monitoring the downstream TCP/IP packets, and monitoring the upstream TCP/IP packets, and enforcing in said wireless communication router a traffic-related policy on at least one of: the downstream TCP/IP traffic, the upstream TCP/IP traffic; wherein the method is implemented in a wireless communication router that comprises at least a hardware processing unit.

Some embodiments of the present invention may be implemented by utilizing any suitable combination of hardware components and/or software modules; as well as other suitable units or sub-units, processors, controllers, DSPs, FPGAs, CPUs, Integrated Circuits, output units, input units, memory units, long-term or short-term storage units, buffers, power source(s), wired links, wireless communication links, transceivers, Operating System(s), software applications, drivers, or the like.

Any of the above-mentioned devices, units and/or systems, may be implemented by using suitable hardware components and/or software components; for example, a processor, a processing core, a Central Processing Unit (CPU), a Digital Signal Processor (DSP), an Integrated Circuit (IC), and Application-Specific Integrated Circuit (ASIC), a memory unit (e.g., Random Access Memory (RAM), Flash memory), a storage unit (e.g., hard disk drive (HDD), solid state drive (SDD), Flash memory), an input unit (keyboard, keypad, mouse, joystick, touch-pad, touch-screen, microphone), an output unit (screen, touch-screen, monitor, audio speakers), a power source (battery, rechargeable battery, power cell, connection to electric outlet), a wireless transceiver, a cellular transceiver, a wired or wireless modem, a network interface card or element, an accelerometer, a gyroscope, a compass unit, a Global Positioning System (GPS) unit, an Operating System (OS), drivers, applications, and/or other suitable components.

In some implementations, calculations, operations and/or determinations may be performed locally within a single device, or may be performed by or across multiple devices, or may be performed partially locally and partially remotely (e.g., at a remote component or a co-located component) by optionally utilizing a communication channel to exchange raw data and/or processed data and/or processing results.

Although portions of the discussion herein relate, for demonstrative purposes, to wired links and/or wired communications, some implementations are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some implementations may utilize a special-purpose machine or a specific-purpose device that is not a generic computer, or may use a non-generic computer or a non-general computer or machine. Such system or device may utilize or may comprise one or more components or units or modules that are not part of a "generic computer" and that are not part of a "general purpose computer", for example, cellular transceiver, cellular transmitter, cellular receiver, GPS unit, location-determining unit, accelerometer(s), gyroscope(s), device-orientation detectors or sensors, device-positioning detectors or sensors, or the like.

Some implementations may utilize an automated method or automated process, or a machine-implemented method or process, or as a semi-automated or partially-automated method or process, or as a set of steps or operations which may be executed or performed by a computer or machine or system or other device.

Some implementations may utilize code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C #, Java, JavaScript, SQL, Ruby on Rails, Go, Cobol, Fortran, ActionScript, AJAX, XML, JSON, Lisp, Eiffel, Verilog, Hardware Description Language (HDL), Register-Transfer Level (RTL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Functions, operations, components and/or features described herein with reference to one or more implementations, may be combined with, or may be utilized in combination with, one or more other functions, operations, components and/or features described herein with reference to one or more other implementations. Some embodiments may comprise any possible or suitable combinations, re-arrangements, assembly, re-assembly, or other utilization of some or all of the modules or functions or components or units that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

What is claimed is:

1. An apparatus comprising:
a wireless communication router, (a) to receive via a wired link downstream TCP/IP packets from the Internet and to wirelessly transmit the downstream TCP/IP packets to one or more Internet-connected devices over one or more wireless communication links, and (b) to wirelessly receive from said one or more Internet-connected devices upstream TCP/IP packets over said one or more wireless communication links and to send the upstream TCP/IP packets to the Internet via said wired link;
wherein the wireless communication router comprises a monitoring and effecting unit, (A) to monitor the downstream TCP/IP packets, and (B) to monitor the upstream TCP/IP packets, and (C) to enforce a traffic-related policy on at least one of: the downstream TCP/IP traffic, the upstream TCP/IP traffic;
wherein the monitoring and effecting unit is pre-installed in a disabled mode in said wireless communication router;
wherein said wireless communication router is (I) to receive an activation signal, initiated by an electronic device of a user of said wireless communication router; and (II) in response to said activation signal, to change said monitoring and effecting unit from being in said disabled mode to being in an enabled mode.

2. The apparatus of claim 1,
wherein the monitoring and effecting unit is to block a particular set of the downstream TCP/IP packets based on said traffic-related policy.

3. The apparatus of claim 1,
wherein the monitoring and effecting unit is to block a particular set of the upstream TCP/IP packets based on said traffic-related policy.

4. The apparatus of claim 1,
wherein the monitoring and effecting unit is to perform bandwidth limiting, based on said traffic-related policy, of at least one of: the downstream TCP/IP traffic, the upstream TCP/IP traffic.

5. The apparatus of claim 1,
wherein the monitoring and effecting unit is to perform traffic filtering, based on said traffic-related policy, of at least one of: the downstream TCP/IP traffic, the upstream TCP/IP traffic.

6. The apparatus of claim 1,
wherein the monitoring and effecting unit is to enforce a parental control rule of said traffic-related policy, on at least one of: the downstream TCP/IP traffic, the upstream TCP/IP traffic.

7. The apparatus of claim 1,
wherein the monitoring and effecting unit is to replace a particular set of downstream TCP/IP packets with a set of replacement TCP/IP packets, based on said traffic-related policy.

8. The apparatus of claim 1,
wherein the monitoring and effecting unit is to replace a particular set of upstream TCP/IP packets with a set of replacement TCP/IP packets, based on said traffic-related policy.

9. The apparatus of claim 1,
wherein the monitoring and effecting unit is to block access of said one or more Internet-connected devices to a particular Internet location, based on said traffic-related policy.

10. The apparatus of claim 1,
wherein the one or more Internet-connected devices comprise at least: a first Internet-connected device of a first device-type, and a second Internet-connected device of a second device-type;
wherein the monitoring and effecting unit is (a) to block access of the first Internet-connected device to a particular Internet location, based on a first rule in said traffic-related policy which applies to said first device-type, and (b) to authorize access of the second Internet-connected device to said particular Internet location, based on a second rule in said traffic-related policy which applies to said second device-type.

11. The apparatus of claim 1,
wherein the monitoring and effecting unit is to perform Deep Packet Inspection (DPI) of at least one of: the downstream TCP/IP traffic, the upstream TCP/IP traffic; and based on said DPI, to determine whether or not to block access of at least one Internet-connected device to a particular Internet location.

12. The apparatus of claim 1,
wherein the one or more Internet-connected devices comprise at least: a first Internet-connected device of a first device-type, and a second Internet-connected device of a second device-type;
wherein the monitoring and effecting unit comprises a device-identification unit, (a) to analyze the downstream TCP/IP packets, (b) to determine that a first group of downstream TCP/IP packets are destined to said first Internet-connected device, (c) to determine that a second group of TCP/IP packets are destined to said second Internet-connected device, (d) to authorize said wireless communication router to wirelessly transmit the first group of downstream TCP/IP packets to said first Internet-connected device, (e) to unauthorize said wireless communication router to wirelessly transmit the second group of downstream TCP/IP packets to said second Internet-connected device.

13. The apparatus of claim 1,
wherein the one or more Internet-connected devices comprise at least: a first Internet-connected device of a first device-type, and a second Internet-connected device of a second device-type;
wherein the monitoring and effecting unit comprises a device-identification unit, (a) to analyze the upstream TCP/IP packets, (b) to determine that a first group of upstream TCP/IP packets originate from said first Internet-connected device, (c) to determine that a second group of TCP/IP packets originate from said second Internet-connected device, (d) to authorize said wireless communication router to relay the first group of upstream TCP/IP packets towards their destination based on the identification of their source as the first Internet-connected device, (e) to unauthorize said wireless communication router to relay the second group of upstream TCP/IP packets to their destination based on the identification of their source as said second Internet-connected device.

14. The apparatus of claim 1,
wherein the monitoring and effecting unit comprises a device-identification unit,
(a) to perform analysis of the upstream TCP/IP packets and the downstream TCP/IP packets,
(b) based on said analysis, to determine that at a first time-point, a wireless communication network served by said wireless communication router included a first number of Internet-connected device;
(c) based on said analysis, to determine that at a second time-point, said wireless communication network served by said wireless communication router included a second, different, number of Internet-connected device;
(d) to trigger said wireless communication router to notify an Internet Service Provider (ISP) that provides Internet traffic to said wireless communication router, that there is a change in the number of Internet-connected devices that are included in said wireless communication network served by said wireless communication router.

15. The apparatus of claim 1,
wherein the monitoring and effecting unit comprises a device-identification unit,
(a) to perform analysis of the upstream TCP/IP packets and the downstream TCP/IP packets,
(b) based on said analysis, to determine that a wireless communication network served by said wireless communication router comprises at least: a first Internet-connected device of a first device-type, and a second Internet-connected device of a second device-type;
(c) to trigger said wireless communication router to send a notification to an Internet Service Provider (ISP) that provides Internet traffic to said wireless communication router, wherein said notification indicates at least the first device-type and the second device-type.

16. The apparatus of claim 1,
wherein the monitoring and effecting unit comprises a device-identification unit,
(a) to perform analysis of the upstream TCP/IP packets and the downstream TCP/IP packets,
(b) based on said analysis, to determine that a wireless communication network served by said wireless communication router comprises at least: a first Internet-connected device of a first device-type, and a second Internet-connected device of a second device-type;
wherein the monitoring and effecting unit triggers said wireless communications router (I) to enforce a first traffic-related policy with regard to traffic that is sent by or destined to devices of said first device-type, and (II) to enforce a second, different, traffic-related policy with regard to traffic that is sent by or destined to devices of said second device-type.

17. The apparatus of claim 1,
wherein the monitoring and effecting unit comprises a device-identification unit,
(a) to perform an Address Resolution Protocol (ARP) scan analysis which determines that a wireless communication network served by said wireless communication router comprises at least: a first Internet-connected device of a first device-type, and a second Internet-connected device of a second device-type;
wherein the monitoring and effecting unit triggers said wireless communications router (I) to enforce a first traffic-related policy with regard to traffic that is sent by or destined to devices of said first device-type, and (II) to enforce a second, different, traffic-related policy with regard to traffic that is sent by or destined to devices of said second device-type.

18. The apparatus of claim 1,
wherein the monitoring and effecting unit comprises a device-identification unit,
(a) to perform analysis of the upstream TCP/IP packets and the downstream TCP/IP packets,
(b) based on said analysis, to determine that a wireless communication network served by said wireless communication router comprises at least: a first Internet-connected device of a first device-type, and a second Internet-connected device of a second device-type;
  wherein the monitoring and effecting unit triggers said wireless communications router (I) to enforce a first traffic-filtering policy with regard to traffic that is sent by or destined to devices of said first device-type, and (II) to enforce a second, different, traffic-filtering policy with regard to traffic that is sent by or destined to devices of said second device-type.

19. The apparatus of claim 1,
  wherein said activation signal is received over said wired communication link, from an Internet Service Provider (ISP) that provides Internet access to said wireless communication router.

20. The apparatus of claim 1,
  wherein the monitoring and effecting unit is dynamically installed into said wireless communication router after said wireless communication router is deployed at a consumer venue, based on an installation signal that triggers a download agent within said wireless communication router to download code that corresponds to functionalities of said monitoring and effecting unit.

21. The apparatus of claim 1,
  wherein the wireless communication router is connected directly to infrastructure of an Internet Service Provider (ISP), via a link that excludes a firewall and excludes traffic-filtering units.

22. The apparatus of claim 1,
  wherein the monitoring and effecting unit is to enforce a user-defined rule that selectively blocks intra-network communication between (i) a first particular Internet-connected device, and (ii) a second particular Internet-connected device.

23. The apparatus of claim 1,
  wherein the monitoring and effecting unit is to enforce a pre-defined rule that selectively blocks intra-network communication between (i) a first particular type of Internet-connected devices, and (ii) a second particular type of Internet-connected devices.

24. The apparatus of claim 1,
  wherein the monitoring and effecting unit is to selectively block intra-network communication between (i) a first particular type of Internet-connected devices, and (ii) a second particular type of Internet-connected devices, based on Deep Packet Inspection (DPI) analysis of traffic within said network.

25. The apparatus of claim 1,
  wherein the monitoring and effecting unit is to selectively block communication from or to said wireless communication router, based on said traffic-related policy.

26. The apparatus of claim 1,
  wherein the monitoring and effecting unit is to selectively block Internet traffic based on a geographic location in which said apparatus is located.

27. The apparatus of claim 1,
  wherein the monitoring and effecting unit is to selectively block Internet traffic based on a particular type of Internet-connected device that is connected within said network.

28. The apparatus of claim 1,
  wherein the monitoring and effecting unit is to selectively block only a particular type of Internet traffic based on said traffic-related policy.

29. A method comprising:
  in a wireless communication router,
  (a) receiving via a wired link downstream TCP/IP packets from the Internet, and wirelessly transmitting the downstream TCP/IP packets to one or more Internet-connected devices over one or more wireless communication links;
  (b) wirelessly receiving from said one or more Internet-connected devices upstream TCP/IP packets over said one or more wireless communication links, and sending the upstream TCP/IP packets to the Internet via said wired link;
  (c) monitoring the downstream TCP/IP packets, and monitoring the upstream TCP/IP packets, and enforcing in said wireless communication router a traffic-related policy on at least one of: the downstream TCP/IP traffic, the upstream TCP/IP traffic;
    wherein the method is implemented in a wireless communication router that comprises at least a hardware processing unit;
    wherein the method is performed by a monitoring and effecting unit, which is pre-installed in a disabled mode in said wireless communication router;
    wherein the method further comprises: in said wireless communication router, (I) receiving an activation signal, initiated by an electronic device of a user of said wireless communication router; and (II) in response to said activation signal, changing said monitoring and effecting unit from being in said disabled mode to being in an enabled mode.

* * * * *